United States Patent
Wang et al.

(10) Patent No.: US 11,803,387 B2
(45) Date of Patent: *Oct. 31, 2023

(54) SYSTEM FOR EXECUTING NEW INSTRUCTIONS AND METHOD FOR EXECUTING NEW INSTRUCTIONS

(71) Applicant: Shanghai Zhaoxin Semiconductor Co., Ltd., Shanghai (CN)

(72) Inventors: Weilin Wang, Beijing (CN); Yingbing Guan, Beijing (CN); Mengchen Yang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,423

(22) Filed: Sep. 10, 2021

(65) Prior Publication Data
US 2022/0206815 A1 Jun. 30, 2022

(30) Foreign Application Priority Data

Dec. 29, 2020 (CN) .......................... 202011591545.6
Dec. 29, 2020 (CN) .......................... 202011591546.0

(51) Int. Cl.
*G06F 9/30* (2018.01)
*G06F 9/38* (2018.01)
*G06F 9/455* (2018.01)
*G06F 9/22* (2006.01)

(52) U.S. Cl.
CPC ............ *G06F 9/3818* (2013.01); *G06F 9/223* (2013.01); *G06F 9/3004* (2013.01); *G06F 9/3017* (2013.01); *G06F 9/30145* (2013.01); *G06F 9/30174* (2013.01); *G06F 9/30189* (2013.01); *G06F 9/455* (2013.01); *G06F 9/45508* (2013.01)

(58) Field of Classification Search
None
See application file for complete search history.

(56) References Cited

U.S. PATENT DOCUMENTS

| | | |
|---|---|---|
| 4,839,797 A | 6/1989 | Katori et al. |
| 4,873,629 A | 10/1989 | Harris et al. |
| 5,630,052 A | 5/1997 | Shah |
| 5,701,442 A | 12/1997 | Ronen |
| 5,781,750 A | 7/1998 | Blomgren et al. |
| 5,794,063 A | 8/1998 | Favor |
| 5,838,987 A | 11/1998 | Brightman et al. |

(Continued)

OTHER PUBLICATIONS

Non-Final Office Action dated Sep. 21, 2022, issued in U.S. Appl. No. 17/471,440 (copy not provided).

(Continued)

*Primary Examiner* — Hyun Nam
(74) *Attorney, Agent, or Firm* — McClure, Qualey & Rodack, LLP

(57) ABSTRACT

A method for executing new instructions includes the following steps: receiving an instruction and determining whether the received instruction is a new instruction. When the received instruction is the new instruction, entering a system management mode, and simulating the execution of the received instruction by executing at least one old instruction in the system management mode.

70 Claims, 15 Drawing Sheets

(56) References Cited

U.S. PATENT DOCUMENTS

| | | | |
|---|---|---|---|
| 5,881,258 A | 3/1999 | Arya | |
| 5,896,519 A | 4/1999 | Worrell | |
| 5,909,567 A | 6/1999 | Novak et al. | |
| 5,983,337 A | 11/1999 | Mahalingaiah et al. | |
| 6,093,213 A | 7/2000 | Favor et al. | |
| 6,496,922 B1 | 12/2002 | Borrill | |
| 6,711,667 B1 | 3/2004 | Ireton | |
| 6,928,536 B2 | 8/2005 | Duesterwald et al. | |
| 7,831,807 B1 | 11/2010 | Johnson et al. | |
| 9,442,794 B1 | 9/2016 | Tian | |
| 9,563,424 B2 | 2/2017 | Sehr et al. | |
| 9,594,927 B2 | 3/2017 | Zimmer et al. | |
| 2001/0010072 A1 | 7/2001 | Yoshida | |
| 2003/0221035 A1 | 11/2003 | Adams | |
| 2004/0111717 A1* | 6/2004 | Abdulhayoglu | G06F 21/125 717/130 |
| 2008/0216073 A1* | 9/2008 | Yates | G06F 9/3861 718/100 |
| 2008/0282241 A1* | 11/2008 | Dong | G06F 9/45533 718/1 |
| 2009/0158015 A1 | 6/2009 | Hillman et al. | |
| 2009/0204785 A1 | 8/2009 | Yates, Jr. et al. | |
| 2009/0222654 A1 | 9/2009 | Hum et al. | |
| 2010/0058034 A1* | 3/2010 | Zaks | G06F 8/441 712/216 |
| 2010/0192137 A1 | 7/2010 | Inglis et al. | |
| 2011/0093627 A1 | 4/2011 | De et al. | |
| 2012/0260042 A1* | 10/2012 | Henry | G06F 9/30174 711/E12.017 |
| 2013/0246768 A1 | 9/2013 | Gschwind | |
| 2013/0305013 A1 | 11/2013 | Ebersole | |
| 2014/0129808 A1* | 5/2014 | Naveh | G06F 9/30145 712/225 |
| 2014/0281399 A1 | 9/2014 | Rash et al. | |
| 2014/0304493 A1* | 10/2014 | Zhong | G06F 9/30181 712/226 |
| 2015/0356297 A1* | 12/2015 | Guri | G06F 21/554 726/23 |
| 2016/0026482 A1 | 1/2016 | Abdallah | |
| 2016/0026486 A1* | 1/2016 | Abdallah | G06F 9/30174 703/26 |
| 2016/0070932 A1 | 3/2016 | Zimmer et al. | |
| 2016/0092236 A1 | 3/2016 | Kanapathipaillai et al. | |
| 2017/0134347 A1* | 5/2017 | Kupreev | H04L 67/02 |
| 2018/0159747 A1* | 6/2018 | Chang | H04L 41/5045 |
| 2018/0322313 A1 | 11/2018 | Yao et al. | |
| 2019/0034316 A1* | 1/2019 | Levit-Gurevich | G06F 11/3612 |
| 2019/0043159 A1 | 2/2019 | Levit-Gurevich et al. | |
| 2019/0220279 A1 | 7/2019 | McNeeney et al. | |
| 2019/0391904 A1* | 12/2019 | Sabharwal | G06N 3/0445 |
| 2020/0073643 A1* | 3/2020 | Tsirkin | G06F 8/423 |
| 2020/0082491 A1* | 3/2020 | Harris | G06T 1/20 |
| 2021/0117251 A1* | 4/2021 | Cristofi | G06F 9/542 |
| 2021/0182724 A1 | 6/2021 | Zou et al. | |
| 2021/0397425 A1 | 12/2021 | Zwarich et al. | |
| 2022/0066933 A1 | 3/2022 | Kamand | |
| 2022/0100527 A1* | 3/2022 | Viste | G06F 9/3879 |
| 2022/0197678 A1 | 6/2022 | Poornachandran et al. | |
| 2022/0206794 A1* | 6/2022 | Wang | G06F 9/223 |
| 2022/0206808 A1* | 6/2022 | Wang | G06F 9/30145 |
| 2022/0206810 A1* | 6/2022 | Wang | G06F 9/30145 |
| 2022/0206812 A1* | 6/2022 | Wang | G06F 9/45516 |
| 2022/0206813 A1* | 6/2022 | Wang | G06F 9/30047 |
| 2022/0206815 A1* | 6/2022 | Wang | G06F 9/3017 |
| 2023/0221957 A1* | 7/2023 | Pool | G06F 9/30145 712/220 |

OTHER PUBLICATIONS

Non-Final Office Action dated Jun. 27, 2022, issued in U.S. Appl. No. 17/471,343 (copy not provided).

Notice of Allowance dated Jul. 11, 2022, issued in U.S. Appl. No. 17/471,387 (copy not provided).

Notice of Allowance dated Oct. 19, 2022, issued in U.S. Appl. No. 117/471,400 (copy not provided).

Non-Final Office Action dated Dec. 1, 2022, issued in U.S. Appl. No. 17/471,170 (copy not provided).

Non-Final Office Action dated Jan. 19, 2023, issued in U.S. Appl. No. 17/471,454 (copy not provided).

Non-Final Office Action dated Jan. 26, 2023, issued in U.S. Appl. No. 17/471,371 (copy not provided).

Non-Final Office Action dated Dec. 21, 2022, issued in U.S. Appl. No. 17/471,359 (copy not provided).

Non-Final Office Action dated Oct. 31, 2022, issued in U.S. Appl. No. 17/471,167 (copy not provided).

Notice of Allowance dated Jun. 22, 2023, issued in U.S. Appl. No. 17/471,454 (copy not provided).

Final Office Action dated Mar. 16, 2023, issued in U.S. Appl. No. 17/471,170 (copy not provided).

Final Office Action dated Apr. 18, 2023, issued in U.S. Appl. No. 17/471,454 (copy not provided).

Non-Final Office Action dated Jul. 18, 2023, issued in U.S. Appl. No. 17/471,371 (copy not provided).

* cited by examiner

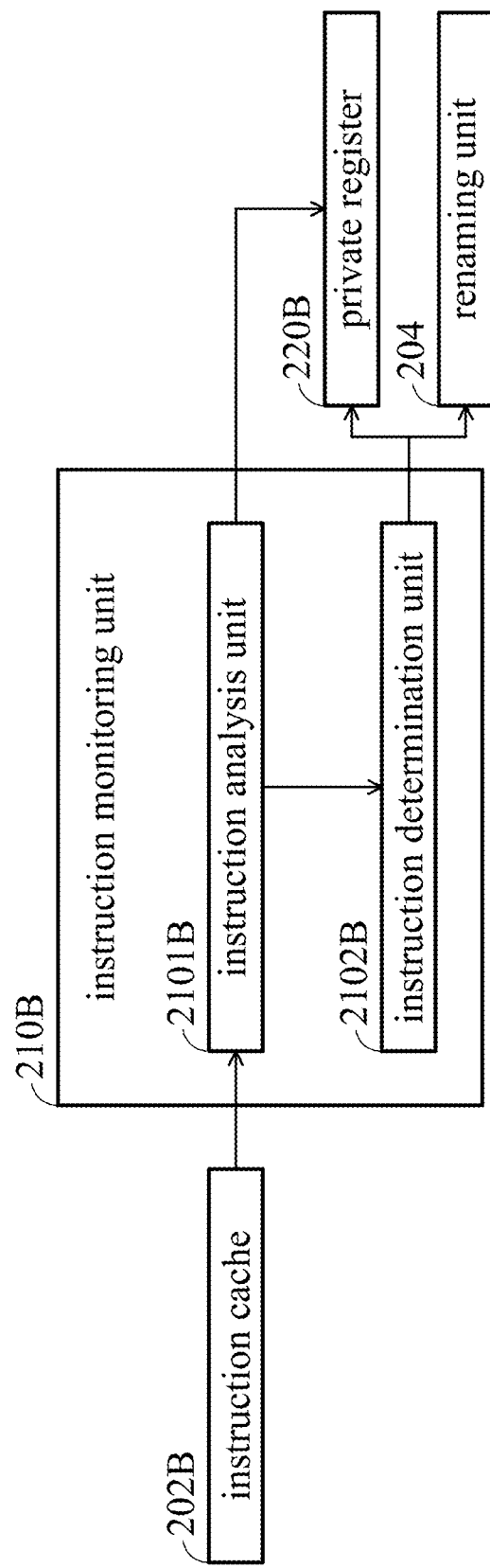
FIG. 2B1

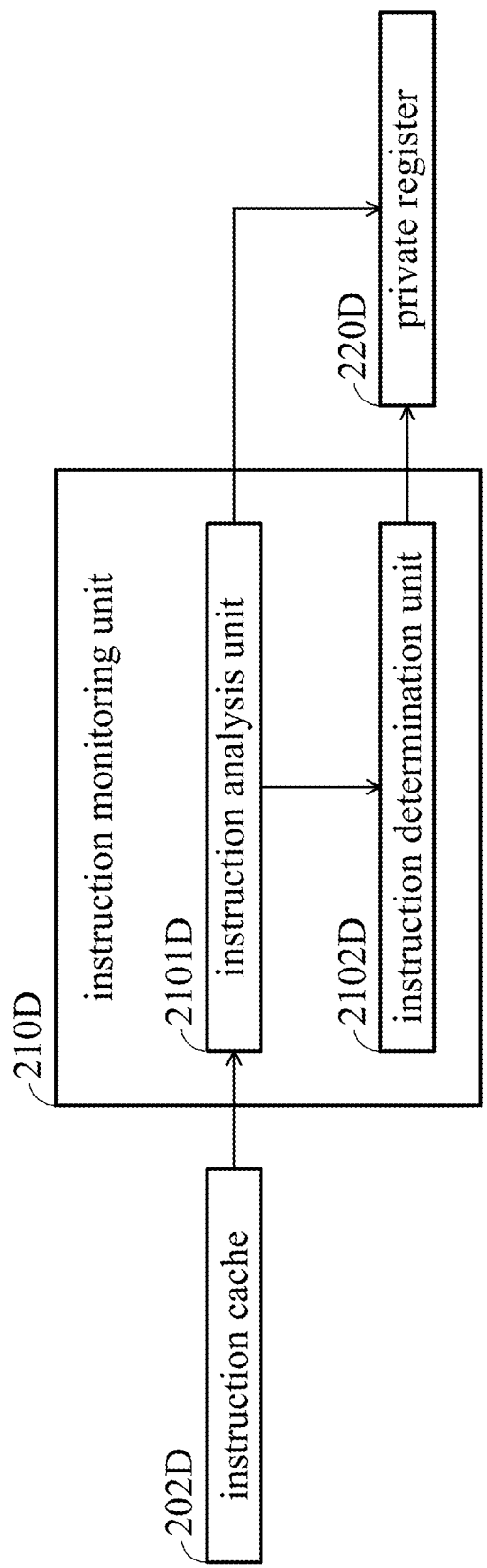
FIG. 2D1

```
1:   void simulator_start()
2:   {
3:       env = setup_simulator_env();
4:       if (! env.emulation_flag) {
5:           exit_to_normal_SMM();
6:       }

7:       decode_excep = check_decode_excep(env, machine_code)
8:       if (decode_excep != no_excep) {
9:           set_exception(decode_excep);
10:          goto out;
11:      }

12:      routine = op_mapping[opcode];
13:      runtime_excep = routine();

14:      if (runtime_excep != no_excep) {
15:          set_exception(runtime_excep);
16:          goto out;
17:      }

18:  out:
19:      execute_rsm();
20:  }

21:  int Unsupport_X_handle(int opsize, void *operandlist)
22:  {
23:      for (i = 0; i < opsize; i++)
24:          op[i] = read_op(operandlist[i]);
25:      operate with op[0:opsize];
26:      write_result_to_SMRAM
27:      if (result has except)
28:          return runtime_excep;
29:      return no_excep;
30:  }
```

FIG. 6

SYSTEM FOR EXECUTING NEW INSTRUCTIONS AND METHOD FOR EXECUTING NEW INSTRUCTIONS

CROSS REFERENCE TO RELATED APPLICATIONS

This Application claims priority of China Patent Application No. 202011591546.0, filed on Dec. 29, 2020, China Patent Application No. 202011591545.6, filed on Dec. 29, 2020, the entirety of which is incorporated by reference herein.

BACKGROUND OF THE INVENTION

Field of the Invention

The present disclosure relates to a method and system for executing instructions, and more particularly to a method and system for executing new instructions.

Description of the Related Art

With the enhancement of processor functions, subsequent generation processors will often add new instructions on the basis of previous generation processors. When implementing new instructions newly supported by subsequent generation processors on previous generation processors, it is often necessary to modify the microarchitecture of the previous generation processors. However, the modification of the microarchitecture requires a lot of work such as design and testing, and the cost is extremely high.

Therefore, how to implement the newly supported instructions of the subsequent generation processors on the basis of the previous generation processors without modifying the microarchitecture of the previous generation processors has become a problem that needs to be solved in this field.

BRIEF SUMMARY OF THE INVENTION

In order to solve the above problem, the present invention provides a method for executing new instructions and a system for executing new instructions.

In accordance with one feature of the present invention, the present disclosure provides a method for executing new instructions. The method for executing new instructions includes the following steps: receiving an instruction, and determining whether the received instruction is a new instruction. When the received instruction is the new instruction, entering a system management mode, and simulating the execution of the received instruction by executing at least one old instruction in the system management mode.

In accordance with one feature of the present invention, the present disclosure provides a system for executing new instructions. The system for executing new instructions includes an instruction monitoring unit. The instruction monitoring unit is configured to determine whether a received instruction is a new instruction. When the received instruction is the new instruction, the system for executing new instructions enters a system management mode, and simulates the execution of the received instruction by executing at least one old instruction in the system management mode.

Through the method for executing new instructions and the system for executing new instructions provided by the present invention, without modifying the microarchitecture of the processor, it is possible to implement the newly added instructions supported by the subsequent generation processors on the previous generation processors. This greatly reduces the workload for design, testing, etc., so a lot of costs can be saved.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIG. 2B1 is a structure diagram of the instruction monitoring unit in accordance with the second embodiment of the present disclosure.

FIG. 2D1 is a structure diagram of the instruction monitoring unit in accordance with the fourth embodiment of the present disclosure.

FIG. 6 shows an example of simulating the execution of the received instructions in the system management mode in accordance with one embodiment of the present disclosure.

DETAILED DESCRIPTION OF THE INVENTION

Figure 1:
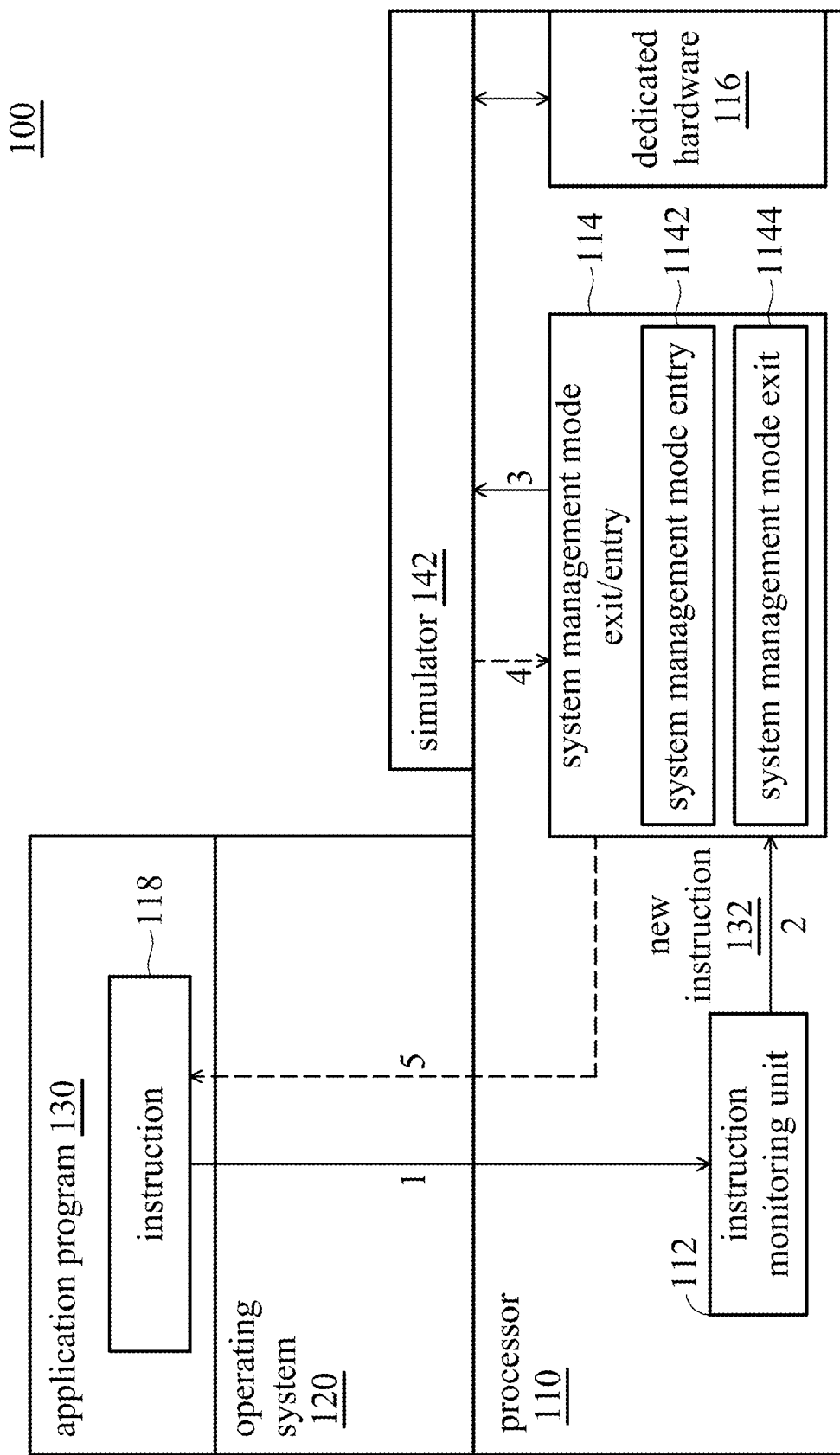
FIG. 1 shows a schematic diagram of a system for executing new instructions in accordance with one embodiment of the present disclosure.

The following description is a better implementation of the invention. This description is made for the purpose of illustrating the general principles of the invention and should not be taken in a limiting sense. The scope of the invention is best determined by reference to the appended claims.

The present invention is described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In order to better describe the embodiments of the present invention, the specific terms used in the present invention are firstly defined as below.

Old instructions: the instructions natively supported by the previous generation processors are called native instructions, also known as existing instructions or old instructions.

Unknown instructions: instructions not natively supported by previous generation processors.

New instruction: compared with the previous generation processor, the instruction newly supported by the subsequent generation processor. The new instruction cannot be recognized by the previous generation processor, so it is an unknown instruction to the previous generation processor.

New architecture registers: compared with the previous generation processors, the new architecture registers supported by the subsequent generation processors. The new architecture register does not exist in the previous generation processor. Therefore, when the new instruction using the new architecture register is simulated and executed on the previous generation processor, the new architecture register needs to be simulated.

Unrecognized instructions: among unknown instructions, the remaining part of the instructions after the newly added instructions is removed. That is, unrecognized instructions refer to instructions that are not natively supported by subsequent processors.

Model specific register: a type of register in the processor that can be used to complete some specific functions.

Traps: traps are generally caused by soft interrupt instructions (such as INT instruction). When an instruction causes a trap, it does not mean that there is an error in the execution of the instruction itself. Therefore, when an instruction occurs a trap, the processor will continue to execute the next instruction of this instruction. For example, when a software developer debugs the software code, he/she can set breakpoints in the code. When the program code with a breakpoint is executed on the processor, when the execution reaches the breakpoint, a trap will be generated, so that the execution of the program code will be suspended at the breakpoint. Software developers can view the value of each architecture register in the processor or the value of each variable in the program code when the program code is executed to a breakpoint through the microcode processing program that handles the trap. According to the value of each structure register or the value of each variable in the program code, it is determined whether the program code is executed normally when the execution reaches the breakpoint.

In addition, in this specification, the simulation and the emulation have the same meanings, and the simulator and the emulator have the same meanings, and simulate and emulate have the same meanings.

FIG. 1 shows a schematic diagram of a system 100 for executing new instructions in accordance with one embodiment of the present disclosure. As shown in FIG. 1, the system 100 for executing new instructions includes a processor 110, an operating system 120, an application program 130, and a simulator 142. The operating system 120 runs on the processor 110 and is used to manage the processor 110. The application program 130 runs on the operating system 120, and can use various functions provided by the processor 110 and other hardware (not shown, such as a hard disk, a network card, etc.) through the operating system 120. The simulator 142 runs on the processor 110 in a system management mode (SMM). The operating system 120 or the application program 130 cannot perceive the execution process of the simulator 142. That is, all operations performed by the simulator 142 are transparent to the operating system 120 or the application 130.

When the processor 110 executes a new instruction of the application 130 or the operating system 120, the processor 110 enters the system management mode, and sends the new instruction to the simulator 142 to simulate the execution of the new instruction. It should be noted that the source code of the application 130 or the operating system 120 is generally written in a high-level language (such as C language, C++ language, etc.) and/or a low-level language (such as assembly language, etc.). After the source code is compiled with a compiler, executable code that can be executed by the processor is generated. Executable code consists of instructions that can be directly executed by the processor. In the present invention, the application program 130 or the operating system 120 refers to the executable code generated after the source code of the application program 130 or the operating system 120 is compiled by a compiler. In the following, we will take the processor 110 in FIG. 1 executing the instruction 118 of the application program 130 as an example to briefly describe the processing process of the system 100 for executing the new instruction.

As shown in FIG. 1, the processor 110 includes an instruction monitoring unit 112 and a system management mode entry/exit 114. The system management mode entry/exit 114 includes a system management mode entry 1142 and a system management mode exit 1144. In FIG. 1, the solid arrow with a digital number indicates the transmission direction of instruction information, and the dashed arrow with a digital number indicates the transmission direction of the instruction simulation execution result. The following describes the entire process of the processor 110 simulating the execution of the new instruction 132.

First, the processor 110 receives an instruction 118, performing a specified function, of the application 130 (as shown by the solid arrow 1). After receiving the instruction 118, the instruction monitoring unit 112 determines whether the instruction 118 is a new instruction 132, and generates an emulation flag (EF). If the instruction 118 is a new instruction 132 (the emulation flag is the first value, in one embodiment, the first value is 1), the processor 110 generates a system management interrupt (#SMI), and at the same time sends the instruction information of the new instruction 132 to the system management mode exit/entry 114 (as shown by the solid arrow 2). How to generate a system management interrupt is the common knowledge of those skilled in the art, and will not be repeated here. Then, the processor 110 enters the system management mode by executing the system management mode entry 1142, and sends the instruction information of the new instruction 132 to the simulator 142 (as shown by the solid arrow 3). In the system management mode, the simulator 142 simulates the execution of the new instruction 132. After the simulation execution of the new instruction 132, the simulator 142 sends the simulation execution result to the system management mode exit/entry 114 (as shown by the dotted arrow 4). Then, the processor 110 exits the system management mode through the system management mode exit 1144, and sends the simulation execution result to the application program 130 (as shown by the dotted arrow 5). At this point, the processor 110 has simulated the execution of the new instruction 132. In an embodiment, the simulator 142 may store the intermediate calculation results generated during the simulation execution of the new instruction 132 in the system management memory (SMRAM).

In another embodiment, the processor 110 further includes a dedicated hardware 116. During simulating the execution of the new instruction 132, the simulator 142 can store the intermediate calculation results generated during the simulation execution into the dedicated hardware 116. In another embodiment, when the operand of the new instruction 132 is a new architecture register, the simulator 142 can use the dedicated hardware 116 to simulate the new architecture register (which will be described in detail later). Compared with accessing the system management memory, since the simulator 142 can access the dedicated hardware 116 at a faster speed, the simulation execution speed can be accelerated.

Figure 2A:
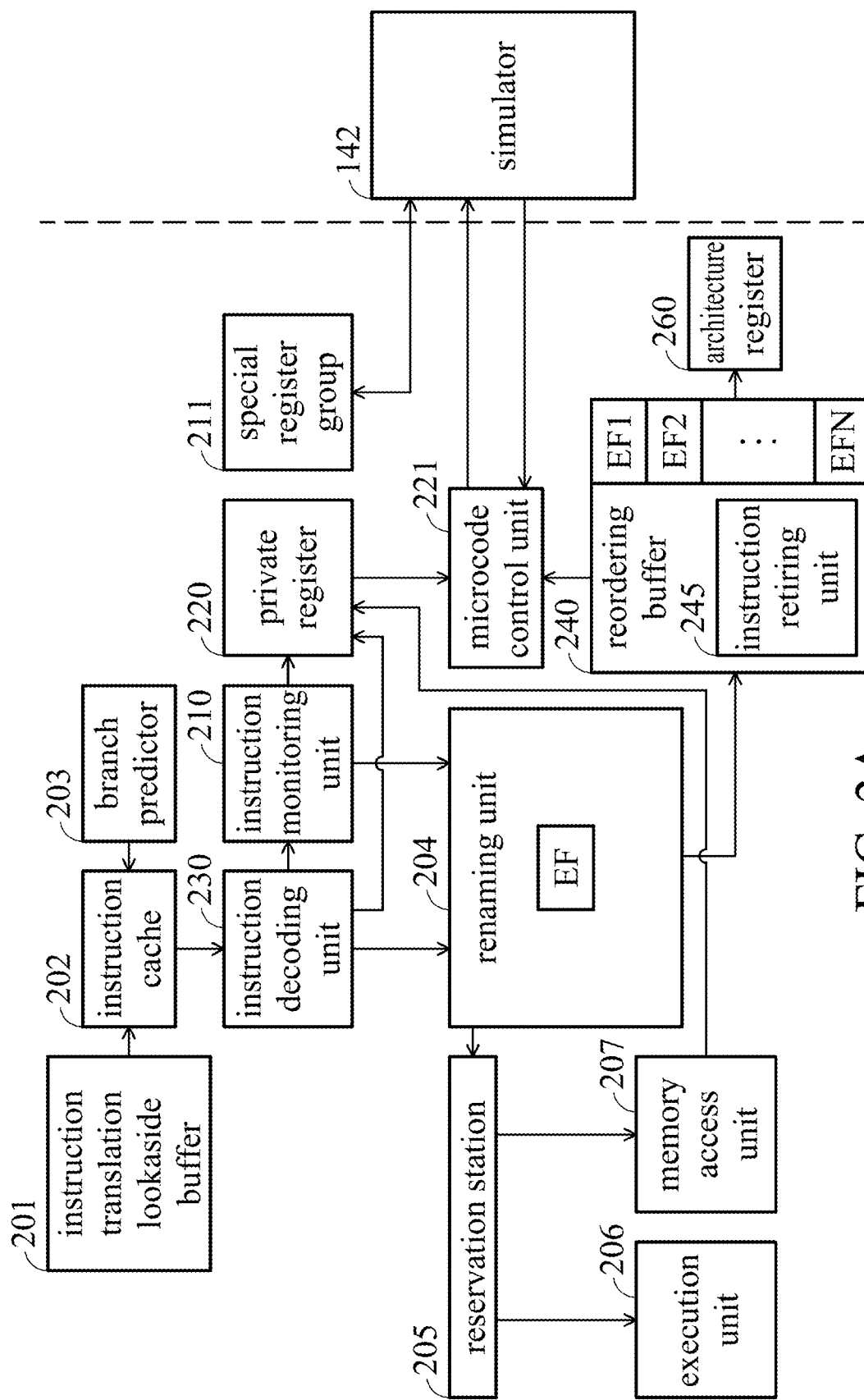
FIG. 2A is a block diagram of the processor in accordance with the first embodiment of the present disclosure.

The present invention has various embodiments, and the present invention will be described with 4 examples below. The first and second embodiments describe the case of entering the system management mode by passing the emulation flag into the pipeline (that is, passing into the renaming unit 204, reordering buffer 240 and other modules as shown in FIG. 2A). The third and fourth embodiments describe the case of entering the system management mode by storing the emulation flag in a private register. In this case, there is no need to transfer the emulation flag to the pipeline. The instruction monitoring unit in the first embodiment and the third embodiment both determine whether the received instruction is a new instruction based on the instruction information of the received instruction from the instruction decoding unit. The instruction monitoring unit in the second embodiment and the fourth embodiment both determine whether the received instruction is a new instruction based on the machine code of the received instruction from the instruction cache. The first embodiment will be described with reference to FIG. 2A and FIGS. 3-7.

First Embodiment

FIG. 2A is a block diagram of the processor in accordance with the first embodiment of the present disclosure. As shown in FIG. 2A, the part on the left of the dotted line is a structural diagram of the processor 110 shown in FIG. 1, and the simulator 142 on the right of the dotted line runs on the processor 110 in the system management mode. The following describes FIG. 2A with reference to FIG. 1.

As shown in FIG. 2A, the processor 110 includes an instruction translation lookaside buffer (ITLB) 201, an instruction cache 202, and a branch predictor 203. When the processor 110 executes an instruction of the application 130 or the operating system 120, the instruction translation lookaside buffer 201 of the processor 110 receives the address of the instruction. The branch predictor 203 is used to predict the conditional branch and transmit the branch prediction result to the instruction cache 202. The instruction cache 202 obtains the address of the received instruction from the instruction translation lookaside buffer 201 according to the branch prediction result, and then the processor 110 performs further processing on the received instruction.

As shown in FIG. 2A, the processor 110 also includes an instruction decoding unit 230, an instruction monitoring unit 210, a private register 220, a renaming unit 204, a reservation station 205, an execution unit 206, a memory access unit 207, and a reordering buffer 240, the microcode control unit 221, the architecture register 260, and the special register group 211. The instruction decoding unit 230 obtains the received instruction from the instruction cache 202, and processes the received instruction to generate a microinstruction. The renaming unit 204 receives the microinstruction from the instruction decoding unit 230, and renames the received microinstruction. Then, the renaming unit 204 sends the renamed microinstruction to the reservation station 205 and the reordering buffer 240. The reservation station 205 sends the microinstruction to the execution unit 206 or the memory access unit 207 for further processing according to the types of the microinstruction. After the reordering buffer 240 receives the microinstruction, it is stored in an instruction entry. The area where the microinstruction is stored in the renaming unit 204 contains an emulation flag field (such as EF in FIG. 2A) for storing the emulation flag in the microinstruction. The reordering buffer 240 contains a plurality of instruction entries, and each instruction entry contains an emulation flag field (such as EF1, EF2, EFN, etc. in FIG. 2A) for storing the emulation flag in the microinstruction.

The instruction decoding unit 230 decodes the received instruction to obtain the decoding information of the received instruction. The decoding information includes prefix, escape code, operation code (opcode), operand mode (ModR/M), and other decoding information, and so on. Then, the instruction decoding unit 230 generates a microinstruction according to the decoding information. In one embodiment, when the received instruction is a new instruction, the generated microinstruction is a no-operation microinstruction (NOP). The instruction decoding unit 230 sends the decoding information of the received instruction to the instruction monitoring unit 210 to determine whether the received instruction is a new instruction. It should be noted that, since the instruction monitoring unit 210 determines whether the unknown instruction is a new instruction by the decoding information such as the prefix, escape code, operation code, and operand mode of the received instruction, those skilled in the art can perform the determining operation through a combinational logic circuit.

After the instruction monitoring unit 210 determines whether the received instruction is a new instruction, it generates an emulation flag. When the received instruction is a new instruction, the emulation flag is a first value, which indicates that the received instruction is an instruction to be simulated; otherwise, the emulation flag is a second value, which indicates that the received instruction is not an instruction to be simulated. In one embodiment, the first value is 1, and the second value is 0. Then, the instruction monitoring unit 210 sends the emulation flag to the private register 220 and the renaming unit 204. When the emulation flag is the first value (indicating that the received instruction is a new instruction), the instruction decoding unit 230 will stop obtaining instructions from the instruction cache 202 and send the decoding information to the private register

220. The private register 220 stores the emulation flag and the decoding information. The renaming unit 204 receives the microinstruction from the instruction decoding unit 230 and the emulation flag from the instruction monitoring unit 210. Then, the renaming unit 204 adds an emulation flag field EF to the microinstruction for storing the emulation flag. When the emulation flag is the second value (that is, the received instruction is not a new instruction), the processor 110 will process the received instruction in a normal processing manner. As for how to process the received instruction in a normal manner, for example, when the received instruction is an old instruction, the execution of the old instruction is common knowledge of those skilled in the art, and will not be repeated here. It is worth noting that the decoding information and emulation flag stored in the private register 220 will not be overwritten when the processor 110 performs a context switch. Only when the processor 110 executes another received instruction, the processor 110 will overwrite the emulation flag stored in the private register 220. For example, if another received instruction is an old instruction, the instruction monitoring unit 210 generates an emulation flag with a second value, and updates the emulation flag field of the private register 220. If the other received instruction is a new instruction, the instruction monitoring unit 210 generates an emulation flag with a first value and the decoding information of the other received instruction, updates the emulation flag field and the field storing the decoding information of the received instruction of the private register 220.

As shown in FIG. 2A, EF1 in the reordering buffer 240 represents the emulation flag EF1 in the emulation flag field of instruction entry 1, EF2 represents the emulation flag EF2 in the emulation flag field of instruction entry 2, and EFN represents the emulation flag of instruction entry N, etc. The reordering buffer 240 includes an instruction retiring unit 245. When the microinstruction is in a retire state and meets the retire conditions, the instruction retiring unit 245 will retire the microinstruction.

When the instruction retiring unit 245 retires the microinstruction, if the emulation flag of the microinstruction is the first value (indicating that the received instruction is a new instruction), the instruction retiring unit 245 will generate a system management interrupt (#SMI). In response to the system management interrupt, the processor 110 will enter the system management mode through the system management mode entry 1142 as shown in FIG. 1 to simulate the execution of the received instruction. During simulating the execution of the received instruction, the intermediate operation result can be stored in the system management memory or the special register in the special register group 211. In one embodiment, the special register group 211 is part of the dedicated hardware 116 shown in FIG. 1.

Figure 3:
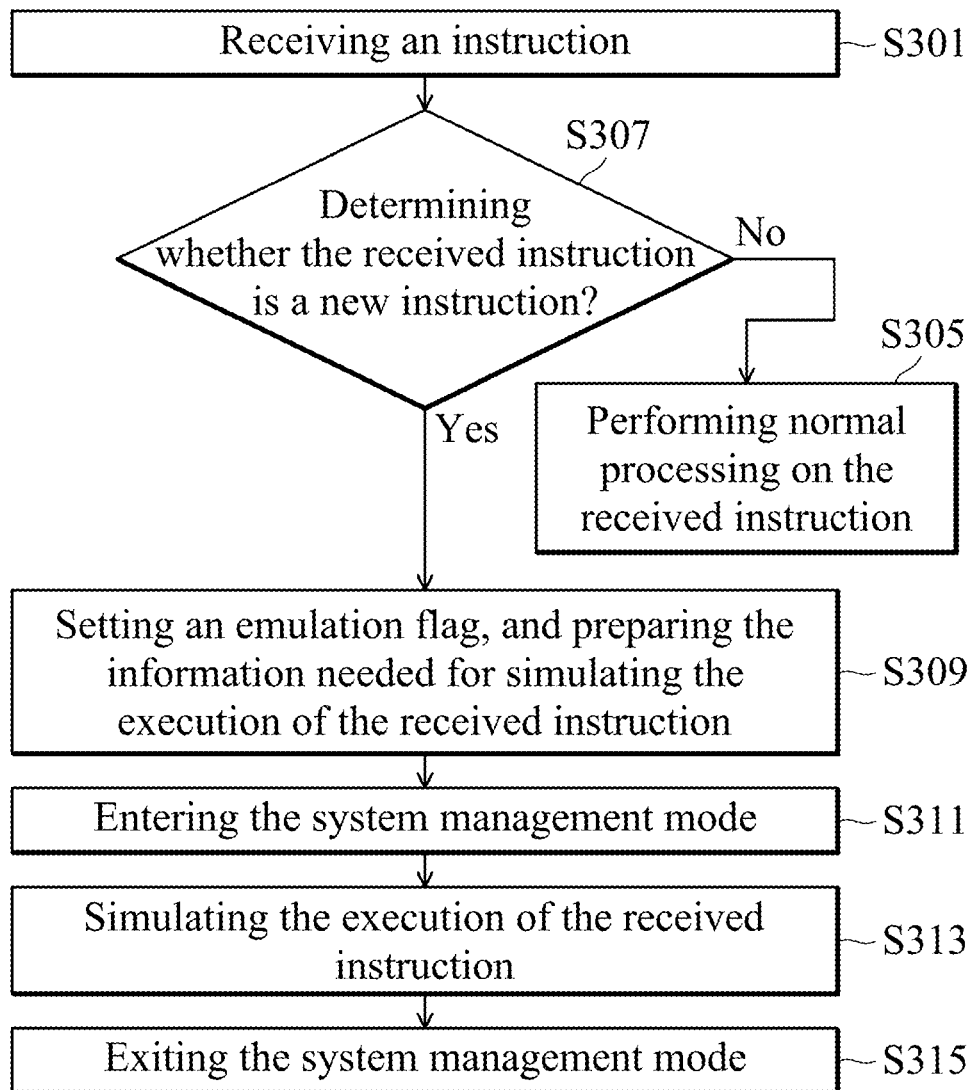
FIG. 3 is a flowchart of processing received instruction in accordance with an embodiment of the invention.

With reference to FIG. 1, FIG. 2A and FIG. 3, how the processor 110 processes the received instruction in the first embodiment will be described in detail below.

Please refer to FIG. 1, FIG. 2A and FIG. 3 at the same time. As shown in FIG. 3, the instruction decoding unit 230 receives an instruction (S301), and determines whether the received instruction is a new instruction (S307). If the received instruction is a new instruction, the system 100 for executing the new instruction will simulate the execution of the received instruction (S313). The detailed description is as follows: the instruction decoding unit 230 firstly executes step S301.

In step S301, the instruction decoding unit 230 receives an instruction. As mentioned above, the instruction decoding unit 230 receives the instruction from the instruction cache 202. Then, step S307 is executed.

In step S307, the instruction monitoring unit 210 determines whether the received instruction is a new instruction. Specifically, as shown in FIG. 2A, the instruction decoding unit 230 first decodes the received instruction to obtain decoding information. The decoding information includes the prefix, escape code, opcode, Length, operand mode (ModR/M), source operand (register or Memory) and destination operands (register or memory), etc. The instruction pointer (or, extended instruction pointer, EIP), escape code, operation code, length, and operand mode of the received instruction are the basic instruction information of the received instruction. The escape code, operation code, and operand mode of the received instruction are basic decoding information of the received instruction. Then, the instruction decoding unit 230 generates microinstruction according to the decoding information, and sends the generated microinstruction to the renaming unit 204. At the same time, the instruction decoding unit 230 sends the decoding information to the instruction monitoring unit 210. The instruction monitoring unit 210 determines whether the received instruction is a new instruction according to the decoding information. For example, the operation codes of the new instructions supported only by the subsequent processors of the processor 110 can be stored in a lookup table. The instruction monitoring unit 210 can check whether the operation code of the received instruction is stored in the lookup table. If the operation code is stored in the lookup table, it means that the received instruction is a new instruction; otherwise, it means that the received instruction is not new instruction. In an embodiment, the lookup table is stored in the instruction monitoring unit 210. The instruction monitoring unit 210 determines whether the received instruction is a new instruction according to the prefix, escape code, and operation code of the received instruction. In another embodiment, the instruction monitoring unit 210 determines whether the received instruction is a new instruction according to the escape code, operation code, and operand mode of the received instruction.

If the received instruction is not a new instruction (the determination result of step S307 is "No"), the processor 110 executes step S305 to perform normal processing on the received instruction. As for how to process the received instruction normally, it is the common knowledge of those skilled in the art, and will not be repeated here. If the received instruction is a new instruction (the determination result of step S307 is "Yes"), the processor 110 executes step S309.

In step S309, the processor 110 sets an emulation flag, and prepares the information needed for simulating the execution of the received instruction. Specifically, after the instruction monitoring unit 210 determines that the received instruction is a new instruction, it generates an emulation flag with a first value, and sends the emulation flag to the renaming unit 204 and the private register 220. The private register 220 stores the emulation flag in its emulation flag field. After the renaming unit 204 receives the emulation flag and the microinstruction, it adds an emulation flag field to the microinstruction, and stores the emulation flag in the emulation flag field of the microinstruction. In one embodiment, the received instruction is a no-operation microinstruction (NOP).

In step S309, when the emulation flag generated by the instruction monitoring unit 210 is the first value, the instruction decoding unit 230 also stores the decoding information and operating-environment information of the received instruction in the private register 220. The operating-environment information refers to state information of the processor 110 when the processor 110 executes the received instruction. The operating-environment information includes the operating mode of the received instruction (that is, the operating mode of the processor 110 when the processor 110 executes the received instruction). For example, the operating mode includes real mode, protected mode, virtual 8086 mode (v8086 mode), compatibility mode, long mode, and so on.

Then, the renaming unit 204 sends the microinstruction to the reordering buffer 240. As shown in FIG. 2A, assuming that the microinstruction is stored in entry 1 of the reordering buffer 240, the value of EF1 is the first value. In one embodiment, the microinstruction does not need to be executed by the execution unit 206, so it does not need to be sent to the reservation station 205.

When the instruction retiring unit 245 retires the microinstruction, since the value of EF1 in the entry 1 storing the above microinstruction is the first value, the instruction retiring unit 245 generates a system management interrupt (#SMI). Then, the microcode control unit 221 executes step S311.

In step S311, the processor 110 enters the system management mode. Specifically, in response to the system management interrupt, the microcode control unit 221 executes the system management mode entry 1142 (that is, enter the microcode processing program entry of the system management interrupt SMI) as shown in FIG. 1. In the system management mode entry 1142, the processor 110 stores the emulation flag (the first value) stored in the private register 220, and the processor 110 stores the decoding information of the received instruction and the operating-environment information into the system management memory, and then enters the system management mode (this will be detailed in conjunction with FIG. 4 later).

Then, the processor 110 executes step S313. In step S313, in the system management mode, the processor 110 simulates the execution of the received instruction (this will be described in detail in conjunction with FIG. 5 and FIG. 6 later).

Finally, the processor 110 executes step S315 to exit the system management mode. Specifically, the microcode control unit 221 executes the system management mode exit 1144 (that is, the microcode processing program exiting the system management mode, SMI exit) as shown in FIG. 1 to exit the system management mode (this will be described in detail in conjunction with FIG. 7 later).

It is worth noting that in the actual operation of entering the system management mode through the system management mode entry 1142 in step S311, those skilled in the art can add some microcodes that save the emulation flag, the decoding information of the above received instructions and the operating-environment information into the system management mode memory (SMRAM) after generating the system management interrupt (#SMI), and ensure that these data/information will not be overwritten when the processor 110 switches to the system management mode. Furthermore, because under the conventional technology, the processor 110 entering the system management mode will access the system management memory, so those skilled in the art can modify this part of the microcode to achieve the purpose of accessing the data/information. Since these microcodes vary according to the processor version, those skilled in the art can write corresponding microcodes according to actual conditions. Similarly, in the actual operation of exiting the system management mode through the system management mode exit 1144 in step S315, those skilled in the art can add some microcodes that store the simulation execution result from the system management memory to the architecture register after calling the resume from system management mode instruction, so as to transmit the simulation execution result to the application program 130 or the operating system 120. Since these microcodes vary according to the processor version, those skilled in the art can write corresponding microcodes according to actual conditions.

In an embodiment, the processor 110 can only directly access the system management memory in the system management mode, but cannot directly access the memory (that is, the system memory, the same below), and all interrupts are disabled in the system management mode. If the received instruction needs to access the memory (for example, when the source operand or the destination operand of the received instruction is a memory operand), the instruction decoding unit 230 will decode the received instruction into a special microinstruction being used to check in advance whether the memory that needs to be accessed by the received instruction can be accessed before entering the system management mode. Specifically, the instruction decoding unit 230 sends the special microinstruction to the renaming unit 204. The renaming unit 204 sends the special microinstructions to the reordering buffer 240 and the reservation station 205. Then, the reservation station 205 sends it to the memory access unit 207. After the memory access unit 207 receives the special microinstruction, it does not perform memory access operations, but only uses the special microinstruction to perform authority checks on the received instructions to generate a check result. Specifically, the memory access unit 207 executes the special microinstruction to realize the authority check on the received instruction, and generates the check result. Then, the access unit 207 stores the check result in the private register 220. The check result includes virtual address, physical address and error code. If the memory cannot be accessed, the error code is a code indicating a specific error. For example, when the error code includes an error code indicating a page fault, it means that if the memory is accessed, a page fault exception will be generated. The difference from the previous embodiment is that in this embodiment, in step S311, the microcode control unit 221 also stores the check result stored in the private register 220 into the system management memory. In this way, after the processor 110 enters the system management mode, it can determine whether the memory is accessible according to the error code in the check result. If the memory can be accessed, the memory is accessed according to the virtual address and the physical address in the check result to obtain the source operand or the destination operand of the received instruction. If the memory cannot be accessed, the error code in the check result is written into the system management memory. After exiting the system management mode, the processor 110 then enters the corresponding exception handler according to the error code stored in the system management memory. In one embodiment, the special microinstruction is memory access pre-check microinstruction. The memory access pre-check microinstruction is the memory read pre-check microinstruction (ld_tickle, namely load tickle) or the memory write pre-check microinstruction (st_tickle, namely store tickle).

In another embodiment, after the memory access unit 207 uses the special microinstruction to perform an authority check on the received instruction, if the check result shows that the memory cannot be accessed, the processor 110 will directly execute the corresponding exception handler according to the error code in the check result.

Figure 4:
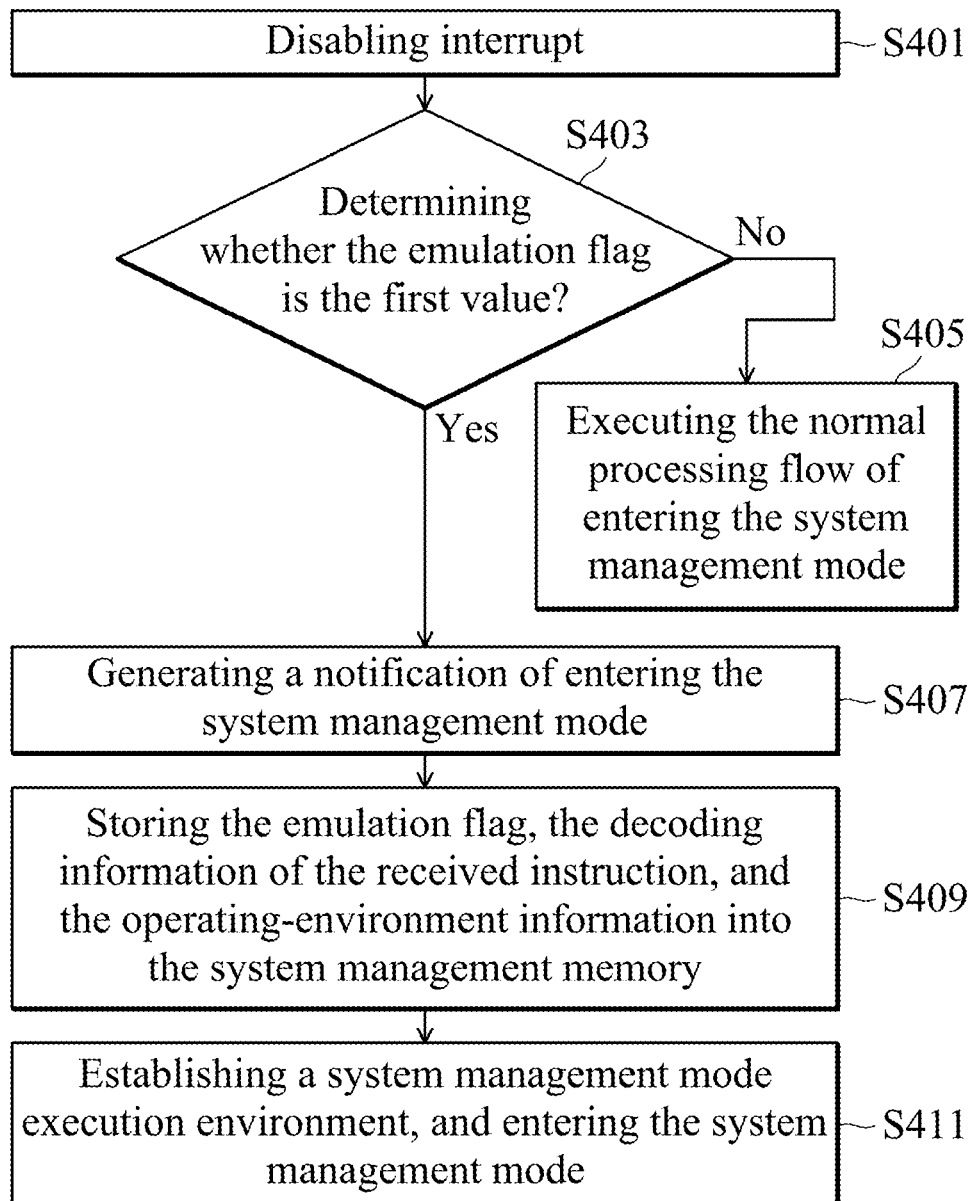
FIG. 4 is a flow chart of entering the system management mode in accordance with one embodiment of the present disclosure.

FIG. 4 is a flow chart of entering the system management mode in accordance with one embodiment of the present disclosure. FIG. 4 is the processing flow of the microcode processing program corresponding to the system management mode entry 1142 shown in FIG. 1. As shown in FIG. 4, the processor 110 disables interrupt. (S401), and determines whether the emulation flag is the first value (S403). If the determination result of step S403 is "Yes", the system management mode is entered. The detailed description is as follows: the processor 110 firstly executes step S401.

In step S401, the processor 110 disables interrupt. Those skilled in the art know that interrupts are disabled in the system management mode. Therefore, the present invention also continues this architectural requirement to disable interrupt. As for how to disable interrupt, for example, the processor 110 clears the IF flag to disable maskable interrupts, clears the TF flag to disable single-step interrupts, and clears DR7 to disable breakpoint interrupts. Then, the processor 110 executes step S403.

In step S403, the processor 110 determines whether the emulation flag is the first value. Specifically, the processor 110 determines whether the value stored in the emulation flag field of the private register 220 is the first value. If the determination result is "No", step S405 is executed to execute the normal processing flow of entering the system management mode. Those skilled in the art know the normal processing flow of the system management mode, so it won't be repeated here. If the determination result is "Yes", the processor 110 executes step S407.

In step S407, the processor 110 generates a notification of entering the system management mode (Assert #smmact) to notify the chipset that the processor 110 will enter the system management mode. How to generate the notification of entering the system management mode is the common knowledge of those skilled in the art, and will not be repeated here. Then, the processor 110 executes step S409.

In step S409, the processor 110 stores the emulation flag, the decoding information of the received instruction, and the operating-environment information into the system management memory. Specifically, the processor 110 reads the emulation flag, the decoding information of the received instruction, and the operating-environment information from the private register 220, and stores the read emulation flag, the decoding information of the received instruction, and the operating-environment information in the system management memory. At the same time, the contents of the architectural registers (that is, the current state of the processor 110) will also be stored in the system management memory. As mentioned above, when the received instruction needs to access the memory, the private register 220 also stores the check result of the received instruction. The processor 110 also reads the check result from the private register 220, and stores the read check result in the system management memory. The information stored in the system management memory is shown in Table 1 as below.

TABLE 1

| architectural registers | emulation flag | decoding information | operating-environment information | check result | . . . |
|---|---|---|---|---|---|
| . . . | . . . | . . . | . . . | . . . | |

Then, the processor 110 executes step S411, establishes a system management mode execution environment, and enters the system management mode. How to establish the execution environment of the system management mode and how to enter the system management mode are common knowledge of those skilled in the art, and will not be repeated here.

Then, the processor 110 simulates the execution of the received instruction in the system management mode (as shown in step S313 in FIG. 3). The following is described in conjunction with FIG. 5.

Figure 5:
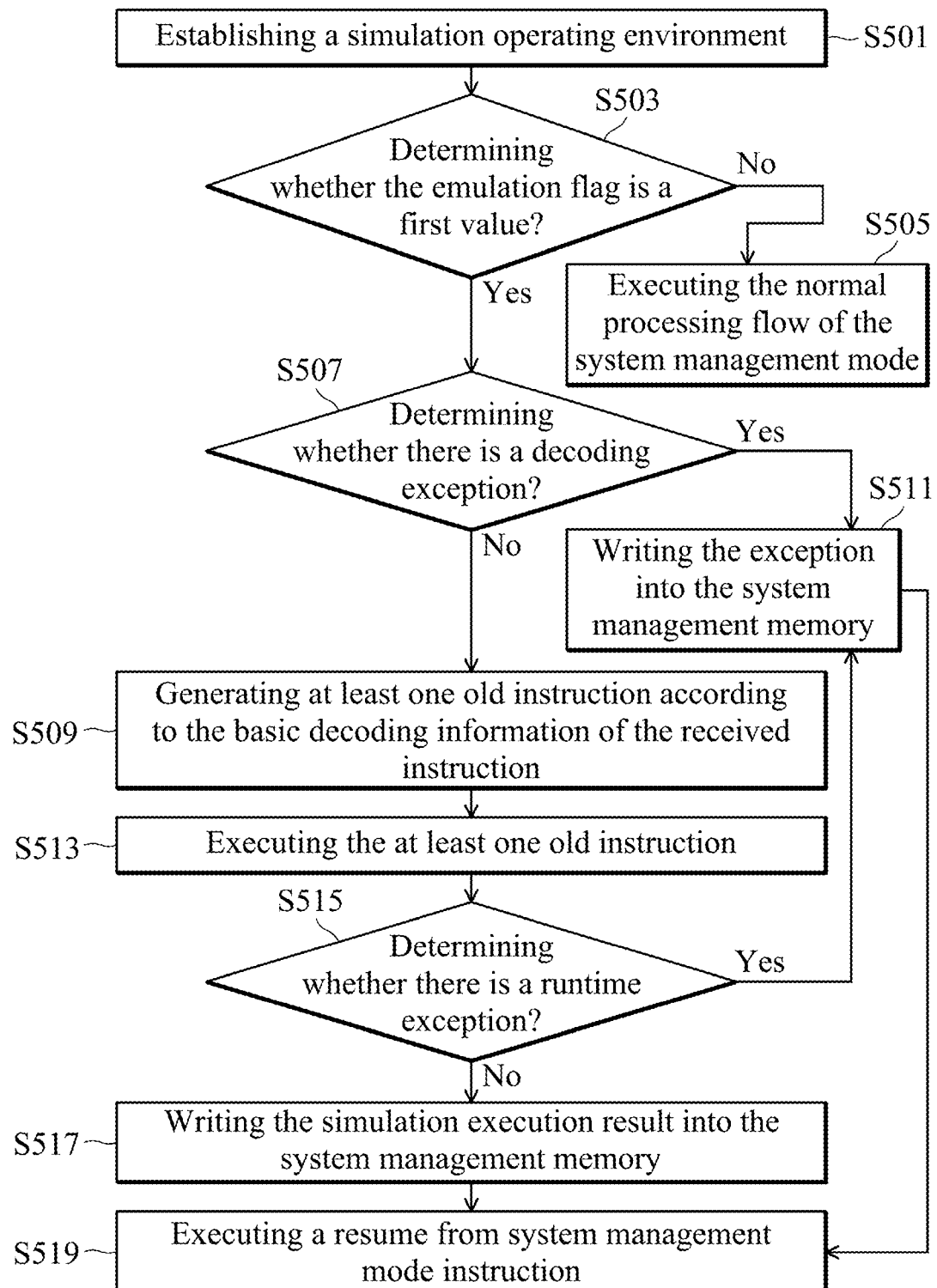
FIG. 5 is a flowchart of a simulator processing flow in accordance with one embodiment of the present disclosure.

FIG. 5 is a flowchart of a simulator processing flow in accordance with one embodiment of the present disclosure. As previously mentioned, the processor 110 runs the simulator 142 in the system management mode. As shown in FIG. 5, in the system management mode, the processor 110 establishes a simulation operating environment (S501), and then determines whether the emulation flag is a first value (S503). If the determination result of step S503 is "Yes", then the processor 110 determines whether there is a decoding exception of the received instruction (S507). If the determination result of step S507 is "No", the processor 110 generates at least one old instruction according to the basic decoding information of the received instruction (S509), and executes the at least one old instruction (S513). The detailed description is as follows: firstly, the processor 110 executes step S501.

In step S501, the processor 110 establishes a simulation operating environment. Specifically, the processor 110 reads the emulation flag, the decoding information of the received instruction, the operating-environment information of the received instruction, and the information of the architecture register from the system management memory. When the received instruction needs to access the memory, the processor 110 also reads the check result from the system management memory. In the subsequent steps, the information read above from the system management memory will be used to simulate the execution of the received instruction. Then, the processor 110 executes step S503.

In step S503, the processor 110 determines whether the emulation flag is a first value. Specifically, the processor 110 determines whether the emulation flag read in step S501 is a first value. If the determination result is "No", the processor 110 executes step S505. In step S505, the processor 110 executes the normal processing flow of the system management mode. The normal processing flow of the system management mode is the common knowledge of those skilled in the art, and will not be repeated here. If the determination result of step S503 is "Yes", the processor 110 executes step S507.

In step S507, the processor 110 determines whether there is a decoding exception. Specifically, the operating-environment information of the received instruction read in step S501 includes the operating environment at the time when the processor 110 executes the received instruction. The processor 110 determines whether the received instruction can be executed in the operating environment. For example, the operating-environment information includes the operating mode of the processor 110. When the operating mode is the real mode, and if the received instruction cannot run in the real mode, the determination result of step S507 is "Yes". If the received instruction can run in the real mode, the determination result of step S507 is "No". In one embodiment, the processor 110 may find out which operating environments the received instruction can run through a lookup table according to the operation code of the received instruction.

In one embodiment, the lookup table is stored in a basic input output system (BIOS). Those skilled in the art know that when the system 100 for executing new instruction is started up, it will execute the basic input output system. The basic input output system contains the code to initialize the system management mode. When the system 100 for executing new instruction executes the code for initializing the system management mode, the lookup table is loaded into the system management memory. Then, the processor 110 can find out that the received instruction can executes in which operating environments from the lookup table according to the operation code of the received instruction.

When the processor 110 determines that there is a decoding exception of the received instruction (the determination result of step S507 is "Yes"), step S511 is executed; otherwise, step S509 is executed. Step S511 will be described firstly.

In step S511, the processor 110 writes the exception into the system management memory. It should be noted that the exception is the simulation execution result of the received instruction. Specifically, the processor 110 writes the exception (i.e., the simulation execution result) into an exception vector table in the system management memory. The exception vector table is used to save part of the information of the simulation execution result. The structure of the exception vector table is shown in Table 2 below. The exception vector table contains two fields: an exception flag and an exception code. The exception flag is used to save the information about whether the simulation execution is successful. When the exception flag is the first exception value, it indicates that there is an exception (that is, the simulation execution fails). When the exception flag is the second exception value, it means that there is no exception (that is, the simulation execution is successful). In one embodiment, the first exception value is 1, and the second exception value is 0. When the exception flag is the first exception value, the value of the exception code field is the exception code, which is usually represented by an integer value. According to the exception code, the processor 110 can find and execute the microcode handler of the corresponding exception through the microcode control unit 221.

TABLE 2

| exception flag | exception code |
|---|---|
| ... | ... |

In step S511, when the exception is a trap, the processor 110 updates the instruction pointer stored in the system management memory to: EIP+Length, so as to the instruction pointer of the processor 110 points to the next instruction set architecture instruction to be executed. EIP is the instruction pointer of the received instruction, and Length is the length of the received instruction. The storage space of the instruction pointer in the system management memory is the storage space corresponding to the architecture register EIP. After executing step S511, the processor 110 executes step S519 to execute the system management mode exit 1144 as shown in FIG. 1 by executing the resume from the system management mode instruction.

In step S507, when the determination result is that there is no decoding exception (that is, when the determination result of step S507 is "No"), the processor 110 executes step S509.

In step S509, the processor 110 generates at least one old instruction according to the basic decoding information of the received instruction. As mentioned above, the basic decoding information includes at least the escape code, operation code, and operand mode of the received instruction. In one embodiment, the processor 110 stores the at least one old instruction corresponding to the received instruction in a lookup table. Then, the processor 110 obtains the at least one old instruction from the lookup table according to the operation code of the received instruction. In one embodiment, when the received instruction includes an escape code, the processor 110 obtains the at least one old instruction from the lookup table according to the escape code and the operation code of the received instruction. In another embodiment, the processor 110 obtains the at least one old instruction from the lookup table according to the escape code, operation code, and operand mode of the received instruction.

It is worth noting that, since the at least one old instruction obtained from the lookup table does not contain other decoding information such as the source operand and/or destination operand of the received instruction, it is necessary to write other decoding information into the at least one old instruction, so that the execution of the received instruction can be simulated. For example, the processor 110 writes the specific values of the source operand and/or the destination operand of the received instruction into a corresponding location in the at least one old instruction. Then, the processor 110 can simulate the execution of the received instruction by executing the at least one old instruction. In one embodiment, the processor 110 writes other decoding information into the at least one old instruction according to the prefix of the received instruction.

In another embodiment, the at least one old instruction corresponding to the received instruction is stored in a basic input output system (BIOS). Those skilled in the art know that when the system 100 for executing new instruction is started up, it will execute the basic input output system. The basic input output system contains the code to initialize the system management mode. When the system 100 executes the code for initializing the system management mode, it loads the at least one old instruction into the system management memory. Then, the processor 110 can obtain the at least one old instruction from the system management memory according to the operation code of the received instruction.

Then, the processor 110 executes step S513. In step S513, the processor 110 executes the at least one old instruction. Specifically, the instruction decoding unit 230 decodes the at least one old instruction to obtain at least one microinstruction, and then the processor 110 executes the at least one microinstruction. During the execution of the at least one old instruction, the processor 110 stores the intermediate calculation result in the system management memory. In another embodiment, the processor 110 stores the intermediate calculation result in the special register group 211. Since the processor 110 accesses the special register group 211 faster, the execution speed of the at least one old instruction can be accelerated.

In one embodiment, when the operand of the received instruction includes a new architecture register, the new architecture register is simulated using a special register or system management memory. For example, when the subsequent processors of the processor 110 include a 1024-bit new architecture register, the processor 110 can use a continuous 1024-bit memory space in the system management memory to simulate the new architecture register. In other words, when the received instruction accesses the new architecture register, the processor 110 actually accesses the continuous 1024-bit memory space in the system management memory. In another embodiment, when the subsequent processors of the processor 110 include a new architecture register with a bit width of 1024-bit, the processor 110 can use a special register of a special register group 211 with a bit width of 1024-bit to simulate the new architecture register. That is, when the received instruction accesses the new architecture register, the processor 110 actually accesses the special register with a bit width of 1024-bit in the special register group 211. In another embodiment, when the special register group 211 only contains special registers with a bit width of 512-bit, it is necessary to use two special registers with a bit width of 512-bit to simulate the new architecture register with a bit width of 1024-bit. In short, the present invention does not limit thereto. The processor 110 can use one or more special registers to simulate a new architecture register.

When the new architecture register is the destination operand of the received instruction, after the at least one old instruction has been executed (that is, after the received instruction is simulated), the processor 110 stores the simulation execution result of the received instruction in the special register or the system management memory. In addition, the simulation execution result will be retained in the special register or the system management memory, and will not be overwritten when the processor 110 enters/exits the system management mode. In this way, when the processor 110 executes another received instruction, and the another received instruction is also a new instruction, and the new architecture register is the source operand of the another received instruction, when the processor 110 simulates the execution of the another received instruction, it directly uses the simulation execution result stored in the special register or the system management memory. It should be noted that the received instruction and the another received instruction may be continuous or not, which is not limited by the present invention.

In the system management mode, the processor 110 can only access the system management memory, but cannot access the system memory in a normal way of accessing the memory. In one embodiment of the present invention, a physical memory direct access interface is provided to implement the operation of accessing the memory in the system management mode. When the received instruction includes a memory operand, the memory operand can be accessed through the physical memory direct access interface. The steps to access memory operands through the above physical memory direct access interface are as follows:

In the first step, the processor 110 converts the virtual address of the memory operand into a physical address. Specifically, the processor 110 uses the physical memory direct access interface to convert the virtual address of the memory operand into a physical address by accessing the page table. The steps to convert a virtual address to a physical address are: 1. Reading the page table base address stored in the architecture register CR3 from the system management memory; 2. Performing the page table query according to the page table base address and the virtual address, and obtaining the physical address after simulating the process of the page table query.

In the second step, the processor 110 reads the value of the memory operand according to the physical address, wherein the physical address is not in the system management memory. Specifically, the processor 110 reads the value of the memory operand according to the physical address through a model specific register (MSR). The specific steps are:

In step 1, the processor 110 writes the address of the model special register into a first register (ECX), and writes the physical address into a second register (EDX:EAX).

In step 2, the processor 110 executes a write MSR (WRMSR) instruction to store the value of the memory operand in the model special register. Specifically, after the processor 110 executes the WRMSR instruction, the physical address will be written into the model specific register. Then, the processor 110 uses the physical address stored in the model special register to load the value of the memory operand from the system memory to the model specific register by executing a load microinstruction from the physical address (ld_phys).

In step 3, the processor 110 executes the read MSR (RDMSR) instruction to read the value of the memory operand from the model specific register, and stores the value of the memory operand in the second register.

After performing step S513, the processor 110 performs step S515. In step S515, the processor 110 determines whether there is a runtime exception. If a runtime exception occurs during the execution of step S513, the determination result is "Yes"; otherwise, the determination result is "No". When the determination result of S515 is "Yes", the processor 110 executes step S511. Step S511 has been described in the foregoing, and will not be repeated here. When the determination result of S515 is "No", the processor 110 executes step S517.

In step S517, the processor 110 writes the simulation execution result into the system management memory. Specifically, firstly the processor 110 writes the second exception value (representing no exception occurs) into the exception flag field of the exception vector table shown in Table 2 in the system management memory. Then, the processor 110 writes the simulation execution result of the received instruction into the storage space corresponding to the architectural register in the system management memory. For example, if the simulation execution result of the received instruction is to change the value of the architecture register ECX to 10H (hexadecimal number, the same below). Then, the processor 110 writes the value 10H into the storage space corresponding to the architecture register ECX in the system management memory. Finally, the processor 110 updates the instruction pointer stored in the system management memory to: EIP+Length, so as to the instruction pointer of the processor 110 points to the next instruction set architecture instruction to be executed. EIP is the instruction pointer of the received instruction, and Length is the length of the received instruction. The instruction pointer in the system management memory is the storage space corresponding to the architecture register EIP. When exiting the system management mode, the value in the storage space corresponding to the architecture register in the system management memory will be written into the corresponding architecture register to send the simulation execution result of the received instruction to the application 130 or the operating system 120. This will be described in detail later.

Then, the processor 110 executes step S519. In step S519, the processor 110 executes a resume from system management mode instruction. After executing the resume from system management mode instruction, the processor 110 executes the microcode handler of the system management mode exit 1144 as shown in FIG. 1. It will be described in detail later in conjunction with FIG. 7.

FIG. 6 shows an example of simulating the execution of the received instructions in the system management mode in accordance with one embodiment of the present disclosure.

FIG. 6, in the form of pseudo code, shows how to realize the processing flow of simulating the execution and the received instruction as shown in FIG. 5, which is a concrete implementation of the simulator.

As shown in FIG. 6, lines 1-20 are the codes included in the simulator's main function simulator start. Lines 21-30 are the codes included in the simulation function Unsupport_X_handle, which contains at least one old instruction corresponding to the received instruction described above. The main function simulator_start is described below firstly.

In the main function simulator_start, the third line of code is firstly executed. The third line of code completes the function of step S501 in FIG. 5, and the processor 110 establishes a simulation operating environment. In the third line of code, the processor 110 establishes a simulation operating environment through the function setup_simulator_env. After executing the third line of code, the processor 110 stores the information, read from the system management memory, into env variables, wherein the information includes the emulation flag, the decoding information of the received instruction, the operating-environment information of the architecture register, and the check result. For example, in line 4 of the code, the value of the emulation flag is accessed through env.emulation_flag. The fourth line of code completes the function of step S503 in FIG. 5, and the processor 110 determines whether the emulation flag is the first value. If the determination result of the code in line 4 is that the emulation flag is not the first value, the code in line 5 is executed. The fifth line of code completes the function of step S505 in FIG. 5, and the processor 110 executes the normal processing flow of the system management mode. In the fifth line of code, the processor 110 enters the normal processing flow of the system management mode by executing the function exit_to_normal_SMM. If the determination result of the fourth line of code is that the emulation flag is the first value, then the 7-8th lines of code are executed. The code in lines 7-8 completes the function of step S507 in FIG. 5, and the processor 110 determines whether there is a decoding exception. In the 7th line of code, the processor 110 checks and obtains the decoded exception code decode_excep of the received instruction by executing the function check_decode_excep. In the code in line 8, the processor 110 determines whether there is a decoding exception according to the value of decode_excep. If there is a decoding exception, the code on line 9 is executed. The 9th line of code completes the function of step S511 in FIG. 5, and the processor 110 writes the exception into the system management memory. In the 9th line of code, the processor 110 writes the exception in the format of Table 2 described above into the system management memory through the function set exception. After executing the code on line 9, the processor 110 executes the code on line 10 to jump to the code on line 18. In the 10th line of code, the processor 110 jumps to the position of the label out (that is, the 18th line) through the instruction goto. Then the processor 110 continue to execute from line 18. Since there is only one label out on line 18 and there is no code to be executed, the processor 110 executes the code on line 19. The code on line 19 completes the function of step S519 in FIG. 5, and the processor 110 executes a resume from system management mode instruction. In the 19th line of code, the processor 110 executes a resume from system management mode instruction through the function execute_rsm. Subsequently, the processor 110 executes the microcode of system management mode exit 1144 as shown in FIG. 1.

If the determination result of the code on line 8 is that there is no decoding exception, the code on line 12 is executed. The 12th line of code completes the function of step S509 in FIG. 5, and the processor 110 generates at least one old instruction according to the basic decoding information of the received instruction. As shown in FIG. 6, in the 12th line of code, the at least one old instruction is found from the table op mapping by using the opcode of the received instruction. The pointer routine is used to represent the at least one old instruction, and the value of routine is the address of the Unsupport_X_handle function. Then, the processor 110 executes the code on line 13. The 13th line of code completes the function of step S513 in FIG. 5, and the processor 110 executes the at least one old instruction. When the routine( ) is executed, the processor 110 actually executes the simulation function Unsupport_X_handle (which will be described in detail later). After the routine( ) is executed, the simulation execution result is saved in runtime_excep. Then, the processor 110 execute the code on line 14. The 14th line of code completes the function of step S515 in FIG. 5, and the processor 110 determines whether there is a runtime exception. In the 14th line of code, the processor 110 determines whether there is a runtime exception according to the value of the simulation execution result runtime_excep. If there is a runtime exception, the code on line 15 is executed. In the 14th line of code, the processor 110 stores the runtime exception in the format of Table 2 described above in the system management memory through the function set_exception. Then, the processor 110 executes the code on the 16th line to jump to the 18th line through the goto instruction. As mentioned above, the processor 110 will execute the code on line 19 next. The function of the 19th line of code has been described above, so I won't repeat it here.

The simulation function Unsupport_X_handle is described below.

In the simulation function Unsupport_X_handle, the 23-24 lines of code are firstly executed. The code in lines 23-24 completes the operation of reading the value of the operand, and the value of the operand is stored in the array op. In line 24, the processor completes the operation of reading operands through the function read_op. Specifically, the function read_op obtains the value of the operand from the env variable described above. The 25th line of code completes the function of step S513 in FIG. 5, and the processor 110 executes the at least one old instruction, that is, the processor 110 simulates the execution of the received instruction. In line 25, op represents the operand of the received instruction, and operate with op represents that the value of the operand of the received instruction is written into the at least one old instruction, and the at least one old instruction is executed. During the execution of line 25, when a runtime exception occurs, the code on line 26 completes the function of step S511 in FIG. 5, and the processor 110 writes the exception into the system management memory. When no runtime exception occurs, the 26th line of code completes the function of step S517 in FIG. 5, and the processor 110 writes the simulation execution result into the system management memory. In line 26, the processor 110 stores the simulation execution result in the format of Table 2 described above in the system management memory through the function write_result_to_SM-RAM. The code on line 27 determines whether a runtime exception occurs when executing line 25. If a runtime exception occurs, the code on line 28 is executed and the exception information is sent to the main function; otherwise, the code on line 29 is executed and the correct execution information is sent to the main function. In the 28th and 29th lines of code, the processor 110 sends the exception information or the correct execution information to the main function simulator_start through the return instruction.

Figure 7:
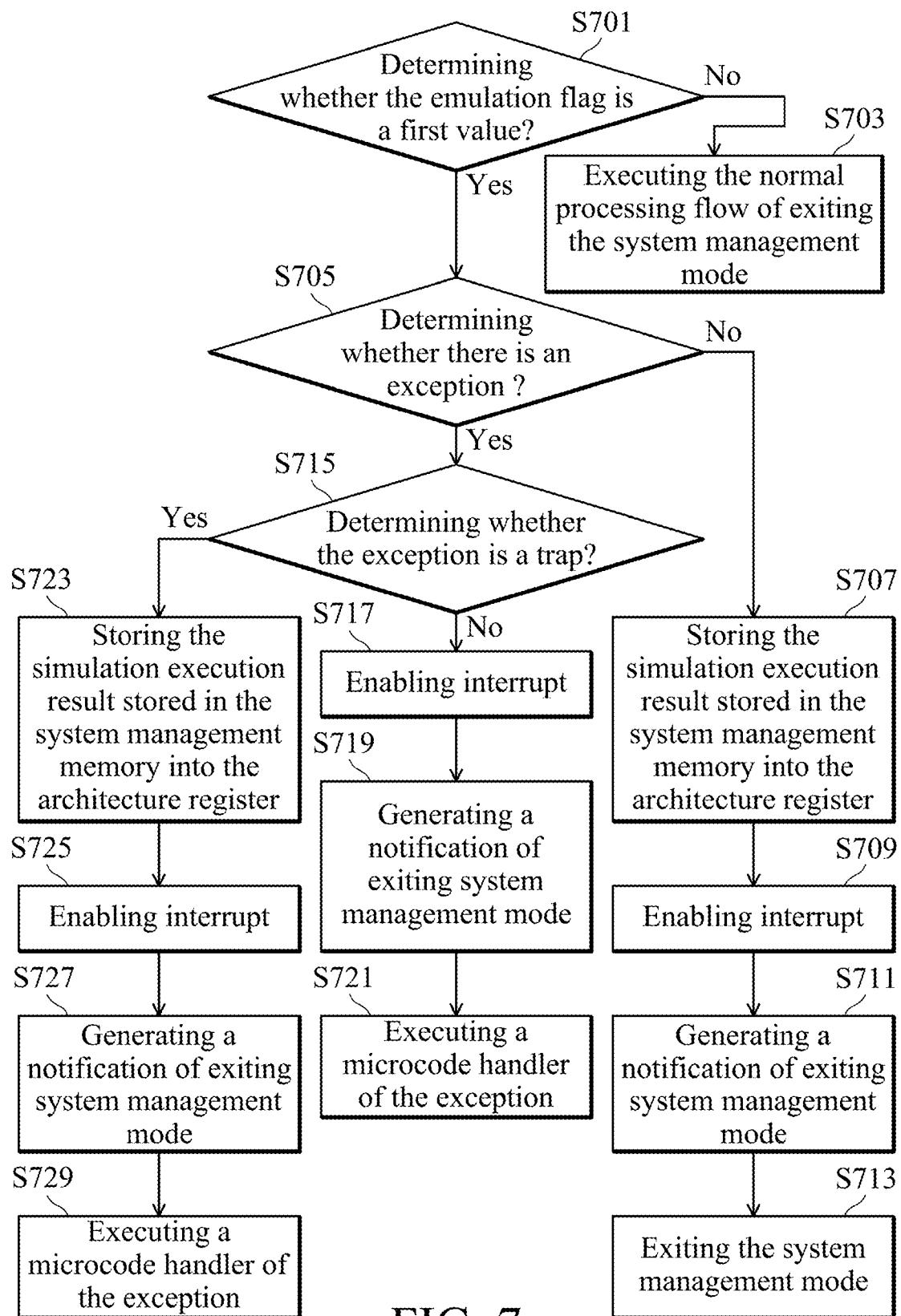
FIG. 7 shows a flowchart of exiting the system management mode in accordance with one embodiment of the present disclosure.

FIG. 7 shows a flowchart of exiting the system management mode in accordance with one embodiment of the present disclosure. FIG. 7 is the processing flow of the microcode processing program corresponding to the system management mode exit 1144 shown in FIG. 1. As shown in FIG. 7, when exiting the system management mode, the processor 110 determines whether the emulation flag is the first value (S701). If the determination result is "Yes", the processor 110 determines whether there is an exception in the simulation execution result (S705). The processor 110 performs an operation to exit the system management mode according to whether there is an exception in the simulation execution result and the type of the exception. The detailed description is as follows: the processor 110 first executes step S701.

In step S701, the processor 110 determines whether the emulation flag is a first value. Specifically, the processor 110 reads the emulation flag from the system management memory, and then determines whether the emulation flag is the first value. If the emulation flag is not the first value, the processor 110 executes step S703. In step S703, the processor 110 executes the normal processing flow of exiting the system management mode. The normal processing flow for exiting the system management mode is the common knowledge of those skilled in the art, and will not be repeated here. If the emulation flag is the first value, the processor 110 executes step S705.

In step S705, the processor 110 determines whether there is an exception in the simulation execution result. Specifically, the processor 110 reads the exception vector table shown in Table 2 above from the system management memory. If the value of the exception flag field of the exception vector table is the first exception value, it means that there is an exception in the simulation execution result, and the determination result is "Yes". If the value of the exception flag field of the exception vector table is the second exception value, it means that there is no exception in the simulation execution result, and the determination result is "No". If the determination result is "No", the processor 110 executes step S707.

In step S707, the processor 110 stores the simulation execution result stored in the system management memory into the architecture register. As described above, in step S517 in FIG. 5, the processor 110 has written the simulation execution result of the received instruction into the storage space corresponding to the architectural register in the system management memory. In this step, the processor 110 stores the value in the storage space corresponding to the architectural register in the system management memory into the architectural register. In this way, it is equivalent to the processor 110 having executed the received instruction.

If the destination operand of the received instruction is a new architecture register, since the architecture register of the processor 110 does not include the new architecture register, the processor 110 will not store the simulation execution result, stored in the storage space of the system management memory that simulates the new architecture register or in the storage space of the special register that simulates the new architecture register, into the architecture register. As mentioned above, when the processor 110 simulates execution of another new instruction, and the operand of another new instruction is also the new architecture register, the processor 110 can directly use the value, stored in the system management memory or in the special register that simulates the new architecture register, to simulate the execution of the another new instruction.

Then, the processor 110 executes step S709. In step S709, the processor 110 enables interrupt. For example, the processor 110 sets the IF flag to enable maskable interrupt, sets the TF flag to enable single-step interrupt, and sets DR7 to enable breakpoint interrupt. Then, the processor 110 executes step S711.

In step S711, the processor 110 generates a notification (Deassert #smmact) of exiting system management mode. Then, the processor 110 executes step S713 to exit the system management mode.

When the processor 110 determines that there is an exception the simulation execution result in step S705, step S715 is executed.

In step S715, the processor 110 determines whether the exception is a trap. Specifically, the processor 110 determines whether the exception in the simulation execution result is a trap according to the exception code in the exception vector table read from the system management memory in step S705. For example, when the exception flag is the first exception value and the exception code is 3 (the content in Table 2 is shown in Table 2-1 below), it indicates an overflow exception. The type of overflow exception is trap, so the determination result is "yes". When the exception flag is the first exception value and the exception code is 0 (the content in Table 2 is shown in Table 2-2 below), it means that it is a division error exception. The division error exception is a fault, not a trap, so the determination result is "No".

TABLE 2-1

| exception flag | exception code |
|---|---|
| 1 | 3 |

TABLE 2-2

| exception flag | exception code |
|---|---|
| 1 | 0 |

When the determination result of step S715 is "No", the processor 110 executes steps S717, S719, and S721. In addition, steps S717 and step S719 are the same as steps S709 and step S711 respectively, and will not be repeated here. Step S721 is described below.

In step S721, the processor 110 executes a microcode handler of the exception. Specifically, the processor 110 determines whether an exception has occurred according to the exception flag in the exception vector table stored in the system management memory. If an exception occurs, the processor 110 executes the microcode handler of the exception according to the exception code stored in the exception vector table. That is, the exception handler corresponding to the above exception code is executed. For example, when the exception flag in the exception vector table stored in the system management memory is the first exception value, it means that the simulation execution result exits exception. If the exception code in the exception vector table is 0 at this time, it means that the above exception is a division error exception, and the processor 110 will execute a microcode handler of the division error exception.

In step S715, when the determination result is "Yes", that is, when the exception type in the simulation execution result is a trap, the processor 110 executes steps S723, S725, S727, and S729. In addition, steps S723, S725, and S727 are the same as steps S707, S709, and S711 respectively, and will not be repeated here. Step S729 is described below.

In step S729, the processor 110 executes a microcode handler of the exception. For example, when there is an exception in the simulation execution result and the exception is an overflow exception, the processor 110 executes a microcode handler of the overflow exception.

Second Embodiment

In the second embodiment, the processor 110 transmits the emulation flag to the pipeline, and the instruction monitoring unit determines whether the received instruction is a new instruction based on the machine code of the received instruction from the instruction cache. The second embodiment will be described below in conjunction with FIG. 2B, FIG. 2B1, and FIG. 3-7.

Figure 2B:
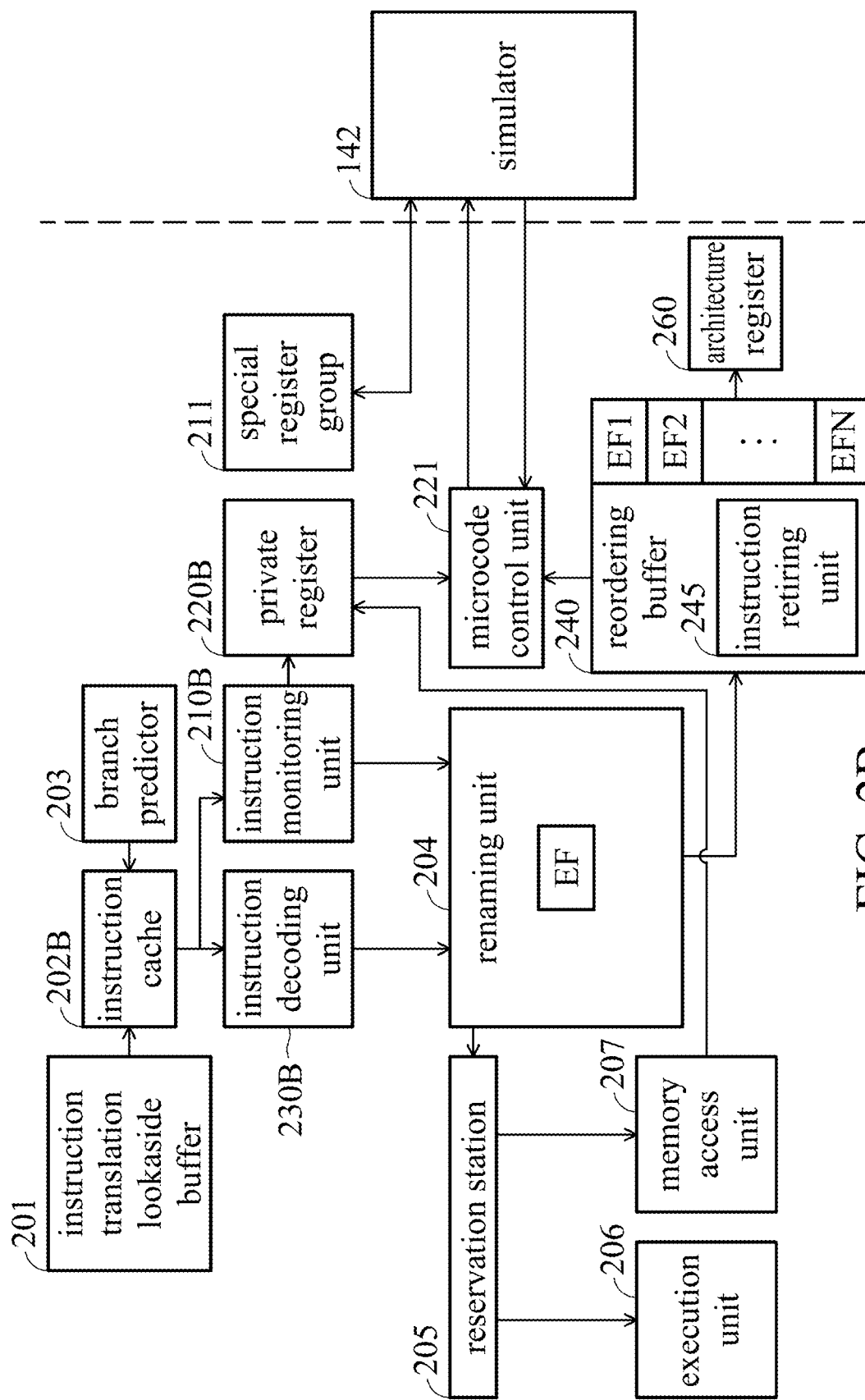
FIG. 2B is a structure diagram of the processor in accordance with the second embodiment of the present disclosure.

The functions of the modules with the same number in FIG. 2B as those of FIG. 2A are the same as the functions of the corresponding modules in FIG. 2A, and will not be repeated here. The following describes the difference between FIG. 2B of the second embodiment and FIG. 2A of the first embodiment.

As shown in FIG. 2B, the instruction monitoring unit 210B directly receives instructions from the instruction cache 202B. Then, the instruction monitoring unit 210B decodes the received instruction to generate decoding information. Then, the instruction monitoring unit 210B determines whether the received instruction is a new instruction according to the decoding information, and generates an emulation flag. Then, the instruction monitoring unit 210B sends the emulation flag to the renaming unit 204 and the private register 220B. When the emulation flag is the first value, the instruction monitoring unit 210B also stores the decoding information and operating-environment information in the private register 220B. The instruction monitoring unit 210B will be described in detail below with reference to FIG. 2B1.

As shown in FIG. 2B1, the instruction monitoring unit 210B includes an instruction analysis unit 2101B and an instruction determination unit 2102B. The instruction analysis unit 2101B decodes the received instruction from the instruction cache 202B, and generates decoding information. Then, the instruction analysis unit 2101B sends the decoding information to the instruction determination unit 2102B. The instruction determination unit 2102B determines whether the received instruction is a new instruction according to the decoding information, and generates an emulation flag. Then, the instruction determination unit 2102B sends the emulation flag to the private register 220B and the renaming unit 204. The private register 220B will store the emulation flag. When the emulation flag is the first value, the private register 220B also stores the decoding information of the received instruction from the instruction analysis unit 2101B.

In the second embodiment, in step S307 in FIG. 3, the difference from the first embodiment is that the processor 110 directly decodes the received instruction through the instruction monitoring unit 210B, and determines whether the received instruction is a new instruction based on the decoding information. In the second embodiment, the other steps in FIG. 3 and the steps in FIGS. 4-7 are the same as those in the first embodiment, and will not be repeated here.

In summary, the difference from the first embodiment is that in this embodiment, the instruction monitoring unit 210B directly reads the machine code of the received instruction from the instruction cache 202B. Then, the instruction monitoring unit 210B analyzes the machine code to generate decoding information. Then, the instruction monitoring unit 210B determines whether the received instruction is a new instruction according to the decoding information. When the received instruction is a new instruction, the instruction monitoring unit 210B generates an emulation flag whose value is the first value. Then the instruction monitoring unit 210B sends the generated emulation flag to the renaming unit 204, and sends the decoding information to the private register 220B. Compared with the first embodiment, in this embodiment, the machine code from the instruction cache 202B is directly parsed without modifying the instruction decoding unit 230B, so it is relatively easy to implement.

Third Embodiment

In the third embodiment, the processor 110 does not pass the emulation flag into the pipeline. The instruction monitoring unit determines whether the received instruction is a new instruction based on the instruction information of the received instruction from the instruction decoding unit. The third embodiment will be described below in conjunction with FIG. 2C and FIGS. 3-7.

Figure 2C:
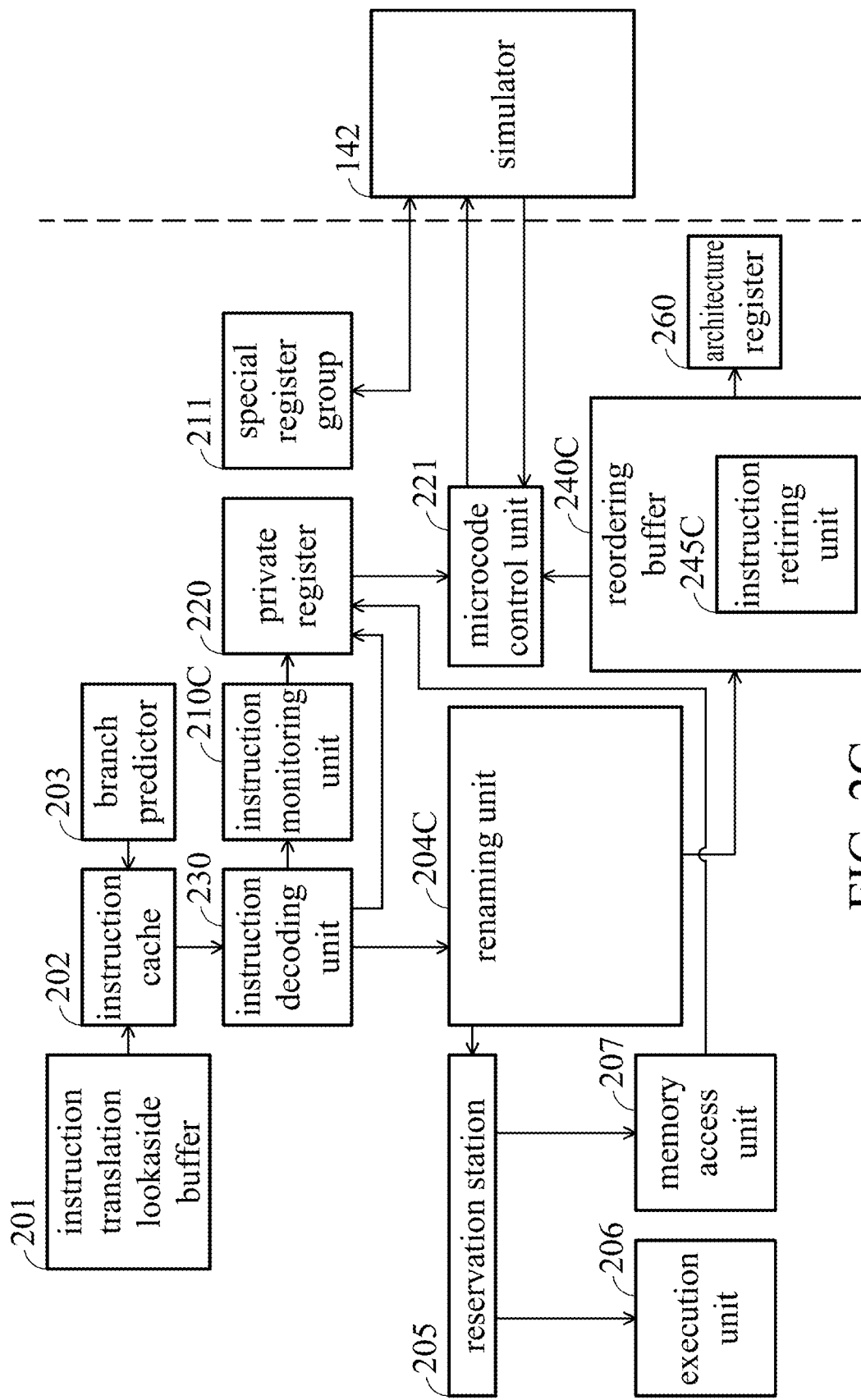
FIG. 2C is a structure diagram of the processor in accordance with the third embodiment of the present disclosure.

The functions of the modules with the same number in FIG. 2C as those of FIG. 2A are the same as those of the corresponding modules in FIG. 2A, and will not be repeated here. The difference between the third embodiment and the first embodiment is that, in the third embodiment, the instruction monitoring unit 210C does not send the emulation flag to the renaming unit 204C. The difference between FIG. 2C of the third embodiment and FIG. 2A of the first embodiment will be described in detail below.

As shown in FIG. 2C, the instruction monitoring unit 210C determines whether the received instruction is a new instruction, and generates an emulation flag. Then, the instruction monitoring unit 210C stores the emulation flag in the private register 220. When the emulation flag is the first value, the private register 220 also stores the decoding information and operating-environment information of the received instruction from the instruction decoding unit 230.

After the instruction decoding unit 230 decodes the received instruction, it generates decoding information. The instruction decoding unit 230 generates a microinstruction according to the decoding information. Those skilled in the art know that when the received instruction is not an old instruction, the microinstruction includes an unknown instruction identifier (UD) whose value is a first value. Then, the renaming unit 204C receives the microinstruction from the instruction decoding unit 230, renames the microinstruction, and sends the microinstruction to the reordering buffer 240C. When the instruction retiring unit 245C retires the above microinstruction, if the unknown instruction identifier in the microinstruction is the first value, an unknown instruction exception is generated. In response to the unknown instruction exception, the microcode control unit 221 executes a microcode handler of the unknown instruction exception. In the microcode handler of the unknown instruction exception, the processor 110 determines whether the emulation flag in the private register 220 is the first value. If the emulation flag in the private register 220 is the first value, the processor 110 generates a system management interrupt. The subsequent processing flow is the same as that of the first embodiment, and will not be repeated here.

The difference from the first embodiment is that in the third embodiment, in steps S307 and S309 in FIG. 3, the instruction monitoring unit 201C does not send the generated emulation flag to the renaming unit 204C. In the third embodiment, the other steps in FIG. 3 and the steps in FIGS. 4-7 are the same as those in the first embodiment, and will not be repeated here.

In summary, different from the first and second embodiments, in this embodiment, after the instruction monitoring unit 210C generates the emulation flag, the emulation flag is only sent to the private register 220. The emulation flag will not be sent to the renaming unit 204C and the reordering buffer 240C. Since the instruction entry of the reordering buffer 240C does not contain an emulation flag, the instruction retiring unit 245C can only generate an unknown instruction exception based on the unknown instruction identifier. In the microcode handler of the unknown instruction exception, the processor 110 generates a system management interrupt according to the emulation flag stored in the private register 220. Compared with the first and second embodiments, this embodiment does not need to modify the renaming unit and the reordering buffer, so it is relatively easy to implement.

Fourth Embodiment

In the fourth embodiment, the processor 110 does not pass the emulation flag into the pipeline, and the instruction monitoring unit determines whether the received instruction is a new instruction based on the machine code of the received instruction from the instruction cache. The fourth embodiment will be described below with reference to FIG. 2D, FIG. 2D1, and FIGS. 3-7.

Figure 2D:
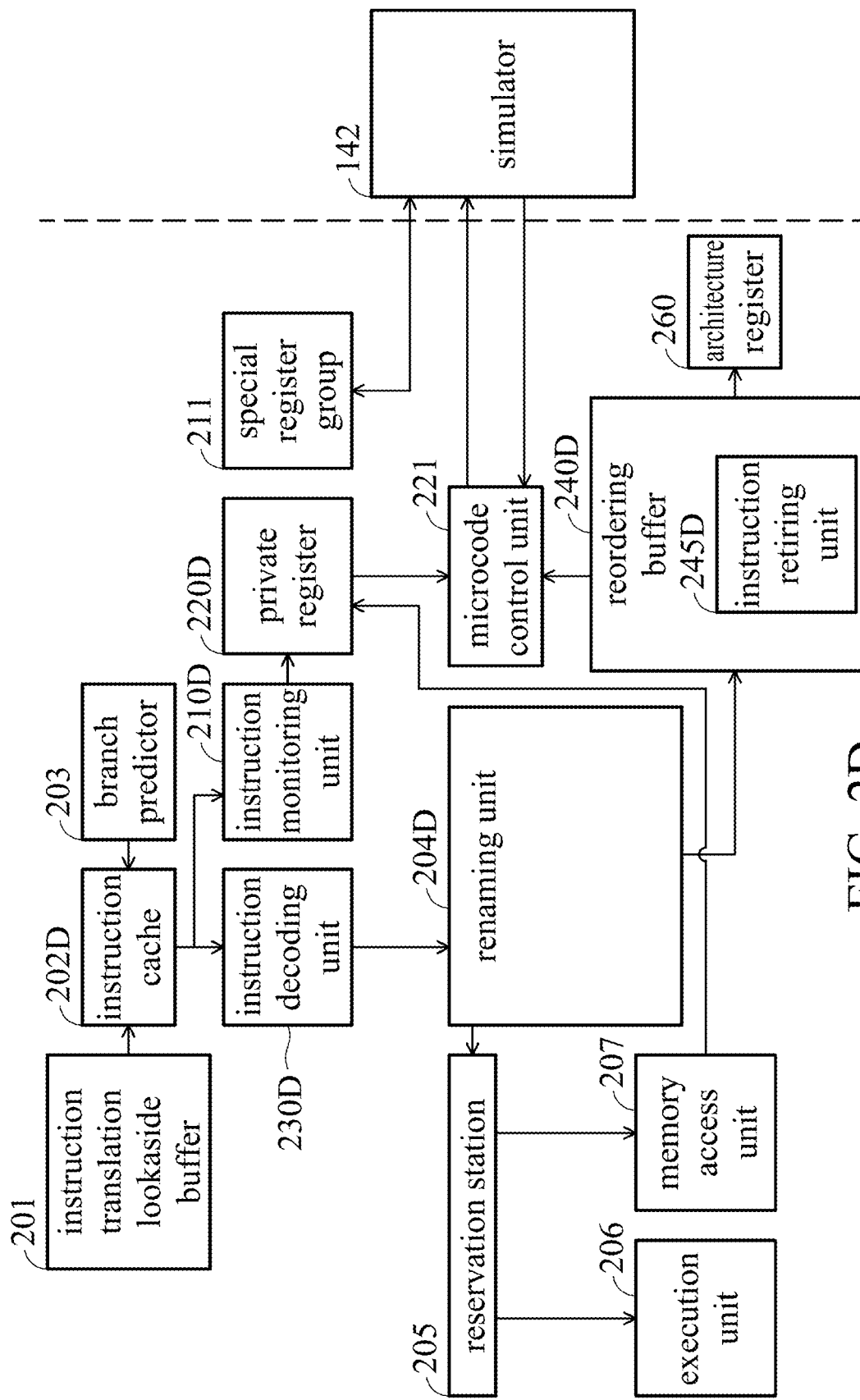
FIG. 2D is a structure diagram of the processor in accordance with the fourth embodiment of the present disclosure.

The functions of the modules with the same number in FIG. 2D as those of FIG. 2A are the same as those of the corresponding modules in FIG. 2A, and will not be repeated here. The difference between the fourth embodiment and the third embodiment is that in the fourth embodiment, the instruction monitoring unit 210D directly obtains the received instruction from the instruction cache 202D, and determines whether the received instruction is a new instruction. The modules 204D, 240D, 245D, and 220D in FIG. 2D are the same as the modules 204C, 240C, 245C, and 220C in FIG. 2C, respectively, and will not be repeated here. The difference between the FIG. 2D of the fourth embodiment and the FIG. 2C of the first embodiment will be described in detail below.

As shown in FIG. 2D, the instruction monitoring unit 210D directly receives instructions from the instruction cache 202D. Then, the instruction monitoring unit 210D decodes the received instruction to generate decoding information. Then, the instruction monitoring unit 210D determines whether the received instruction is a new instruction according to the decoding information, and generates an emulation flag. Then, the instruction monitoring unit 210D sends the emulation flag to the private register 220D. When the emulation flag is the first value, the instruction monitoring unit 210D also stores the decoding information and operating-environment information in the private register 220D. The instruction monitoring unit 210D will be described in detail below with reference to FIG. 2D1.

As shown in FIG. 2D1, the instruction monitoring unit 210D includes an instruction analysis unit 2101D and an instruction determination unit 2102D. The instruction analysis unit 2101D decodes the received instruction from the instruction cache 202D, and generates decoding information. Then, the instruction analysis unit 2101D sends the decoding information to the instruction determination unit 2102D. The instruction determination unit 2102D determines whether the received instruction is a new instruction according to the decoding information, and generates an emulation flag. Then, the instruction determination unit 2102D sends the emulation flag to the private register 220D. The private register 220D stores the emulation flag. When the emulation flag is the first value, the private register 220D also stores the decoding information of the received instruction from the instruction analysis unit 2101D.

In the fourth embodiment, in step S307 in FIG. 3, the difference from the third embodiment is that the processor 110 directly decodes the received instruction through the instruction monitoring unit 210D, and determines whether the received instruction is a new instruction based on the decoding information. In the fourth embodiment, the other steps in FIG. 3 and the steps in FIGS. 4-7 are the same as those in the third embodiment, and will not be repeated here.

In summary, similar to the third embodiment, compared with the first and second embodiments, the instruction monitoring unit in this embodiment does not need to send the emulation flag to the renaming unit and reordering buffer. It is not need to modify the renaming unit and reordering buffer, so it is relatively easy to implement. In addition, different from the third embodiment, in this embodiment, the instruction monitoring unit 210D directly reads the machine code of the received instruction from the instruction cache 202D. Then, the instruction monitoring unit 210D analyzes the received machine code to generate decoding information. Then, the instruction monitoring unit 210D determines whether the received instruction is a new instruction according to the decoding information. When the received instruction is a new instruction, the instruction monitoring unit 210D generates an emulation flag whose value is the first value. Then the instruction monitoring unit 210D sends the decoding information to the private register 220D. Compared with the third embodiment, in this embodiment, the machine code from the instruction cache 202D is directly parsed without modifying the instruction decoding unit 230D, so it is relatively easy to implement.

It is worth noting that the four embodiments all implement the functions of entering and exiting the simulator 142 by modifying the existing code for entering and exiting the system management mode. In another embodiment, it is also possible to add special codes for entering and exiting the system management mode for the system 100 that executes the new instruction, and define a new system management interrupt number. Then, by calling the new system management interrupt number, the new special code for entering the system management mode is executed. In the new special code for entering the system management mode, the processor 110 writes a special entry flag with the first value to the system management memory, and then enters the system management mode. In the system management mode, the processor 110 executes the simulator 142 to simulate execution of new instruction. After simulating the execution of the new instruction, the simulator 142 determines whether the special entry flag in the system management memory is the first value. If the special entry flag is the first value, the simulator 142 executes the new code to exit the system management mode. In one embodiment, the simulator 142 executes the new special code for exiting the system management mode through a call instruction (call) or a jump instruction (jmp).

All the functions described in the foregoing first, second, third, and fourth embodiments can be implemented based on the new code for entering and exiting the system management mode. In order to achieve better execution results, when the functions of the foregoing four embodiments are implemented based on the new special code for entering and exiting the system management mode, the steps of determining whether the emulation flag is the first value in FIG. 4 and FIG. 7 can be deleted. Because in the special code to enter and exit the system management mode, there is no need to consider the normal system management mode processing code. For example, steps S403 and S405 in FIG. 4 can be deleted, and steps S701 and S703 in FIG. 7 can be deleted. In addition, step S409 in FIG. 4 needs to be modified to "Storing the emulation flag, the special entry flag, the decoding information of the received instruction, and the operating-environment information in the system management memory". Step S519 in FIG. 5 needs to be changed to "when the special entry flag is the first value, execute the new special exit system management mode code; otherwise, execute the exit system management mode instruction". The 19th line of code in FIG. 6 needs to be changed to: "if (newEntryFlag==1) execute_newExit( ); else execute_rsm( );". In addition, newEntryFlag is the special entry flag, and execute_newExit( ) means to execute the new special exit system management mode code.

According to the above description, the modified FIG. 4 is the special processing flow of the code that enters the system management mode. The modified FIG. 7 is the special processing flow of the code for exiting the system management mode. The modified FIG. 5 shows the processing flow of the simulator 142 when using special codes to enter and exit the system management mode. The modified FIG. 6 is an example of simulating the execution of new commands when using special codes to enter and exit the system management mode. The following describes step S409 in the modified FIG. 4 and step S519 in the modified FIG. 5 respectively.

In step S409 of the modified FIG. 4, the processor 110 stores the emulation flag, the special entry flag, the decoding information of the received instruction, and the operating-environment information into the system management memory. Specifically, the processor 110 generates an emulation flag and a special entry flag whose values are the first value, and writes the generated special and special entry flag into the system management memory. In addition, the processor 110 reads the decoding information and operating-environment information of the received instruction from the private register 220, and writes the read decoding information and operating-environment information of the received instruction into the system management memory.

In step S519 in the modified FIG. 5, when the special entry flag is the first value, the processor 110 executes the new special code for exiting the system management mode; otherwise, the processor 110 executes the exit system management mode instruction. Specifically, the processor 110 reads the special entry flag from the system management memory, and determines whether the read special entry flag is the first value. When the special entry flag is identified as the first value, the processor 110 executes the new special code for exiting the system management mode; otherwise, the processor 110 executes the resume from the system management mode instruction. It is worth noting that the function completed by the code on line 19 of the modified FIG. 6 is the function of this step.

To sum up, compared with the original code for entering and exiting the system management mode, when using the special code for entering and exiting the system management mode, those skilled in the art can optimize the code for entering and exiting the system management mode. Therefore, higher execution efficiency can be achieved.

Figure 8:
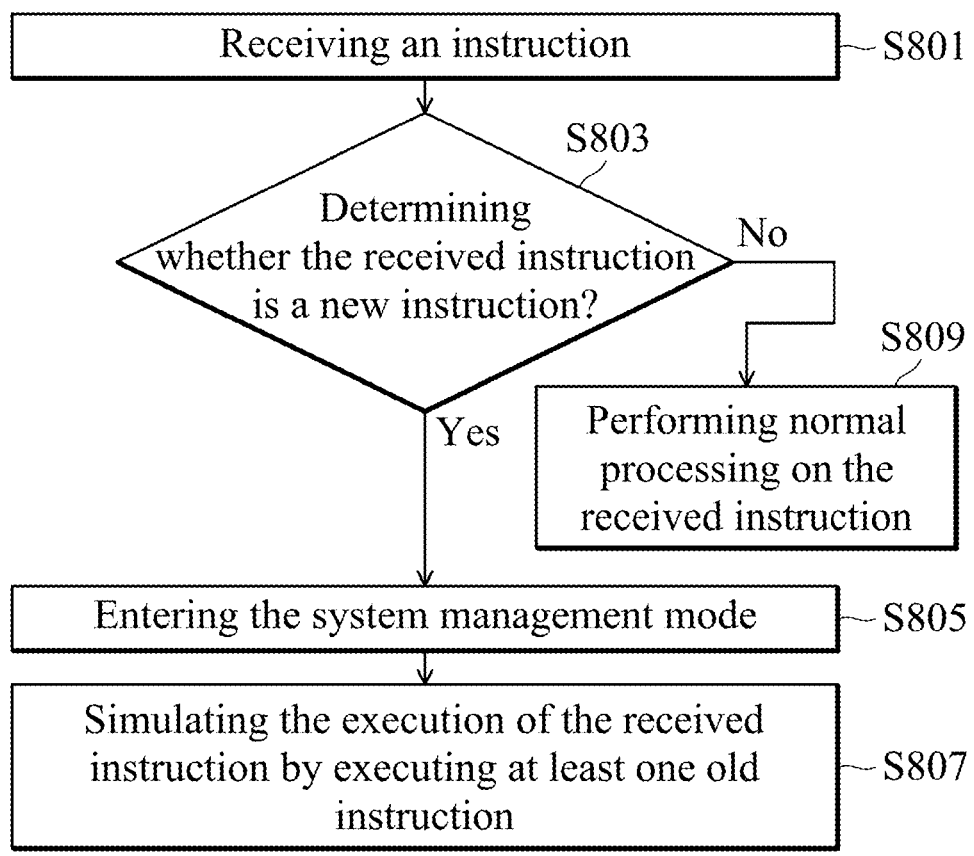
FIG. 8 shows a flowchart of executing a new instruction in accordance with one embodiment of the present disclosure.

FIG. 8 shows a flowchart of executing a new instruction in accordance with one embodiment of the present disclosure. As shown in FIG. 8, the processor 110 receives an instruction (S801), and determines whether the received instruction is a new instruction (S803). When the received instruction is a new instruction, the processor 110 enters the system management mode (S805), and simulates the execution of the received instruction by executing at least one old instruction in the system management mode (S807).

In FIG. 8, step S801 is the same as step S301 in FIG. 3; step S803 is the same as step S307 in FIG. 3; step S805 is the same as step S311 in FIG. 3; step S807 is the same as step S313 in FIG. 3; Step S809 is the same as step S305 in FIG. 3. Therefore, the above steps will not be repeated here.

Figure 9:
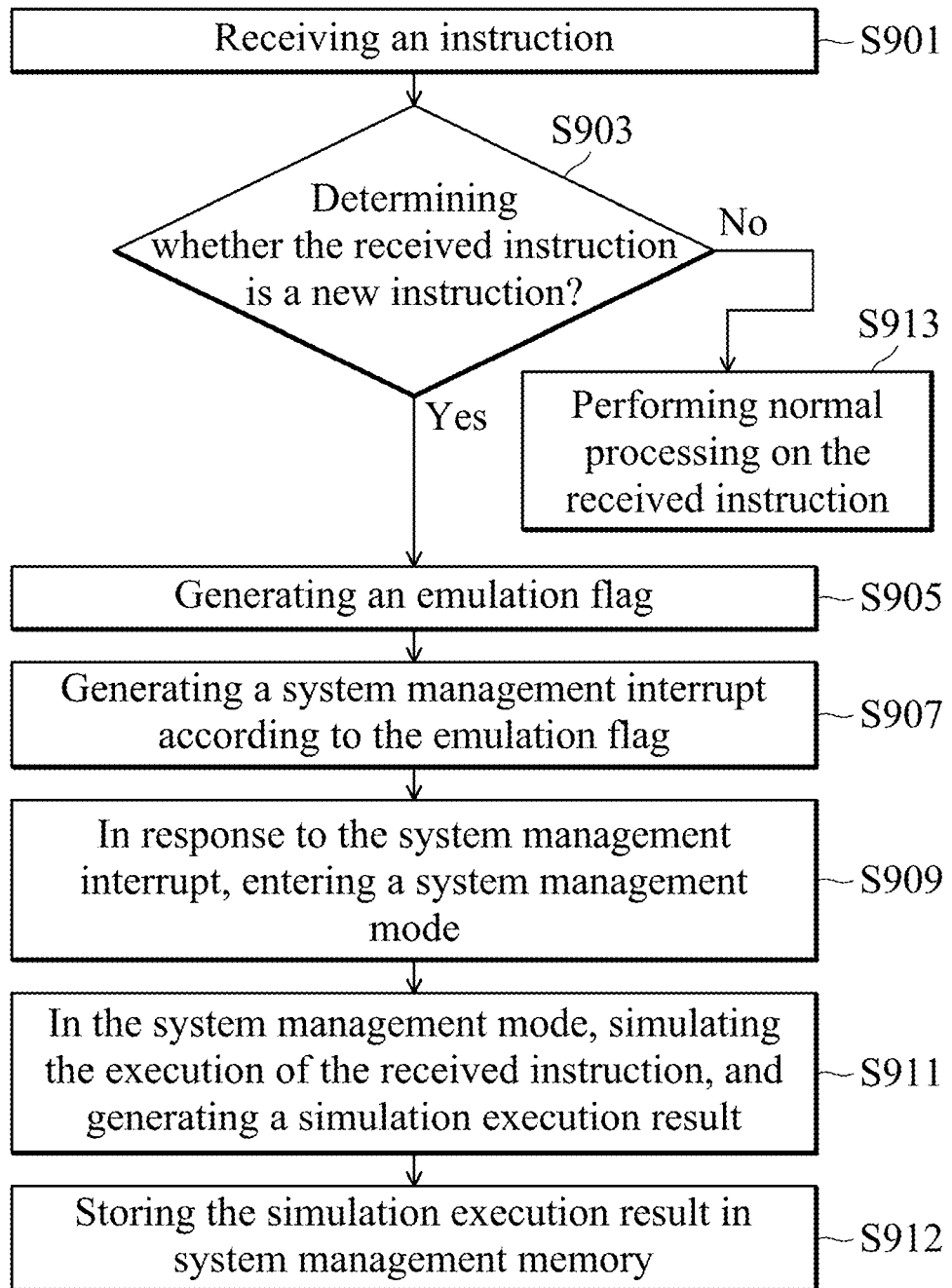
FIG. 9 shows a flowchart of executing a new instruction in accordance with one embodiment of the present disclosure.

FIG. 9 shows a flowchart of executing a new instruction in accordance with one embodiment of the present disclosure. As shown in FIG. 9, the processor 110 receives an instruction (S901), and determines whether the received instruction is a new instruction (S903). When the received instruction is a new instruction, the processor 110 generates an emulation flag (S905). Then, the processor 110 generates a system management interrupt according to the emulation flag (S907). In response to the system management interrupt, the processor 110 enters a system management mode (S909). In the system management mode, the processor 110 simulates the execution of the received instruction, and generates a simulation execution result (S911), and the processor 110 stores the simulation execution result in system management memory (S912).

In FIG. 9, step S901 is the same as step S301 in FIG. 3; step S903 is the same as step S307 in FIG. 3; step S909 is the same as step S311 in FIG. 3; step S912 is the same as step S517 in FIG. 5; Step S913 is the same as step S305 in FIG. 3. Therefore, steps S901, S903, S909, S912, and S913 will not be repeated here. The steps S905, S907 and S911 are described below.

In step S905, the processor 110 generates an emulation flag. Specifically, when the instruction monitoring unit 210 determines that the received instruction is a new instruction, it generates the emulation flag. As for the details of generating the emulation flag, please refer to the previous description of the instruction monitoring units 210, 210B, 210C and 210D in FIGS. 2A, 2B, 2C, and 2D, and refer to the step S309 of FIG. 3 in the previous section. The related description is not repeated here.

In step S907, the processor 110 generates a system management interrupt according to the emulation flag. For how to generate the system management interrupt according to the emulation flag, please refer to the description of steps S403 and S407 in the foregoing, and the description will not be repeated here.

In step S911, in the system management mode, the processor 110 simulates the execution of the received instruction in the system management mode, and generates a simulated execution result. Specifically, the processor 110 generates at least one old instruction according to the basic decoding information of the received instruction, and then simulates the execution of the received instruction by executing the at least one old instruction, and generates a simulated execution result. For a more detailed description, please refer to the description of steps S509 and S513 in FIG. 5 above.

Figure 10:
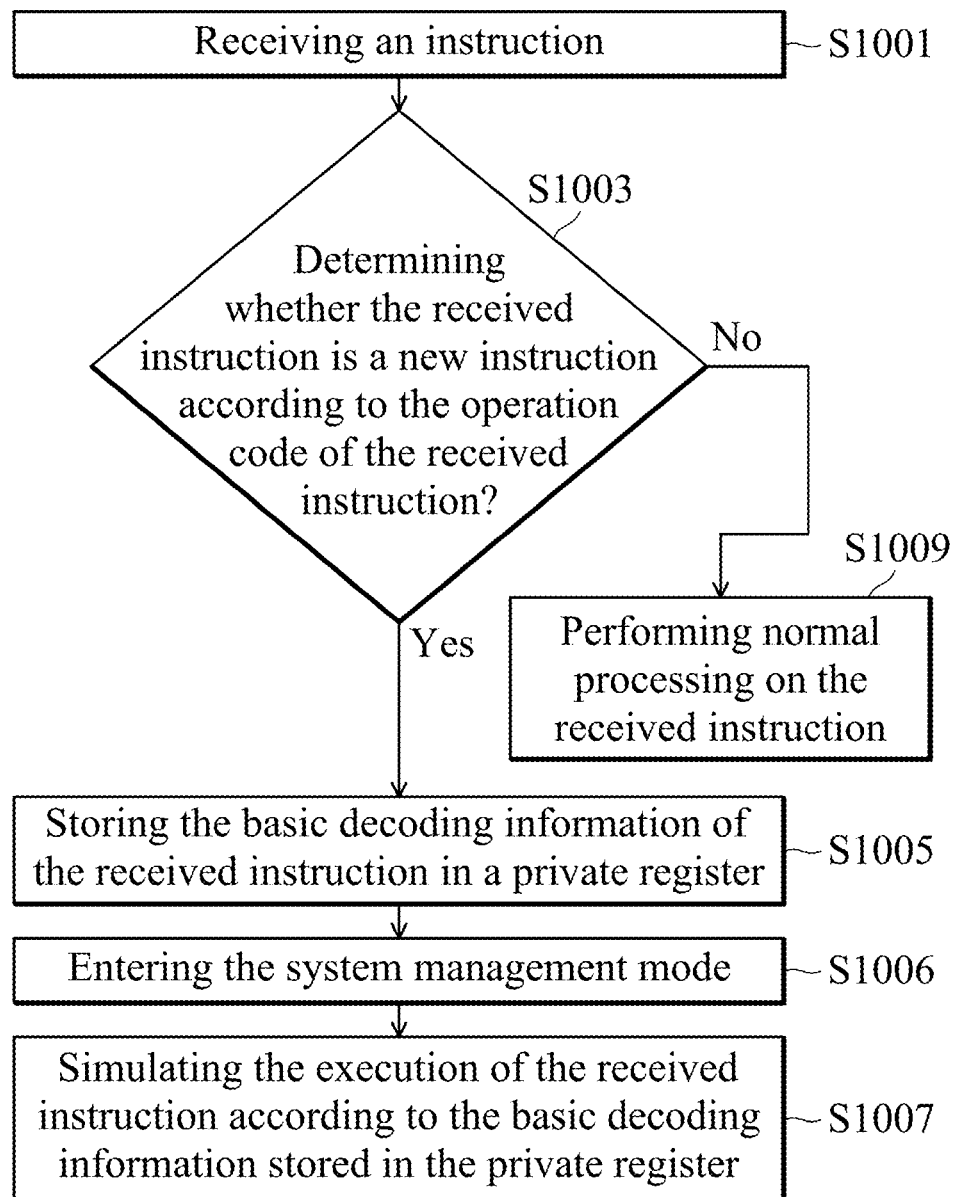
FIG. 10 shows a flowchart of executing a new instruction in accordance with one embodiment of the present disclosure.

FIG. 10 shows a flowchart of executing a new instruction in accordance with one embodiment of the present disclosure. As shown in FIG. 10, the processor 110 receives an instruction (S1001), and determines whether the received instruction is a new instruction according to the operation code of the received instruction (S1003). When the received instruction is a new instruction, the processor 110 stores the basic decoding information of the received instruction in a private register (S1005). Then, the processor 110 enters the system management mode (S1006). In the system management mode, the processor 110 simulates the execution of the received instruction according to the basic decoding information stored in the private register (S1007).

In FIG. 10, step S1001 is the same as step S301 in FIG. 3; step S1003 is the same as step S307 in FIG. 3; step S1006 is the same as step S311 in FIG. 3; step S1007 is the same as step S313 in FIG. 3; Step S1009 is the same as step S305 in FIG. 3. Therefore, the above steps will not be repeated here. Step S1005 is described below.

In step S1005, the processor 110 stores the basic decoding information of the received instruction in a private register. For specific implementation details, please refer to the previous description of the instruction monitoring units 210, 210B, 210C and 210D in FIG. 2A, FIG. 2B, FIG. 2C, and FIG. 2D, and refer to the previous description of step S309 in FIG. 3. The related descriptions are not repeated here.

Through the method for executing new instructions and the system for executing new instructions, it is possible to support the new instructions supported by the subsequent generation processors on the previous generation processors, without modifying the microarchitecture of the processor. This greatly reduces the workload for design, testing, etc., so a lot of costs can be saved.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of other implementations as may be desired and advantageous for any given or particular application.

What is claimed is:

1. A method for executing new instructions, comprising:
receiving an instruction; and
determining whether the received instruction is a new instruction;
wherein when the received instruction is the new instruction, entering a system management mode, and simulating the execution of the received instruction by executing at least one old instruction in the system management mode;
wherein when the received instruction is the new instruction, the method for executing new instructions further comprises:
decoding the at least one old instruction to obtain at least one microinstruction; and
executing the at least one microinstruction;
wherein, each old instruction is an instruction set architecture instruction.

2. The method for executing new instructions of claim 1, wherein when the received instruction is the new instruction, the method for executing new instructions further comprises:
setting an emulation flag in a private register to a first value; and
entering the system management mode according to the emulation flag in the private register.

3. The method for executing new instructions of claim 1, wherein when the received instruction is the new instruction, the method for executing new instructions further comprises:
decoding the received instruction into a microinstruction, wherein the microinstruction includes an emulation flag; and
setting the emulation flag of the microinstruction to a first value.

4. The method for executing new instructions of claim 3, wherein when the received instruction is the new instruction, the microinstruction is a no-operation microinstruction, and the emulation flag of the no-operation microinstruction is the first value.

5. The method for executing new instructions of claim 3, wherein when the received instruction is the new instruction, if the received instruction needs to access memory, the microinstruction is a special microinstruction, and the method for executing new instruction further comprises:
when the emulation flag of the special microinstruction is the first value, using the special microinstruction to check permissions of the received instruction, and generating a check result; and
storing the check result in a private register.

6. The method for executing new instructions of claim 5, wherein the check result comprises a virtual address, a physical address, and an error code.

7. The method for executing new instructions of claim 5, wherein when the received instruction is the new instruction, the method for executing new instructions further comprises:
simulating the execution of the received instruction according to the check result.

8. The method for executing new instructions of claim 3, wherein when the received instruction is the new instruction, the method for executing new instructions further comprises:
according to the emulation flag of the microinstruction, generating a system management interrupt; and
according to the system management interrupt, entering the system management mode.

9. The method for executing new instructions of claim 8, wherein when the received instruction is the new instruction, the method for executing new instructions further comprises:
when the microinstruction is retired, generating the system management interrupt according to the emulation flag of the microinstruction.

10. The method for executing new instructions of claim 1, wherein when the received instruction is the new instruction, the method for executing new instructions further comprises:
storing basic instruction information and operating-environment information of the received instruction into a system management memory; and
in the system management mode, according to the basic instruction information and the operating-environment information stored in the system management memory, executing the at least one old instruction to simulate the execution of the received instruction.

11. The method for executing new instructions of claim 10, wherein when the received instruction is the new instruction, the method for executing new instructions further comprises:

decoding the received instruction to obtain the basic instruction information of the received instruction;
storing basic instruction information of the received instruction in a private register; and
reading the basic instruction information from the private register, and storing the read basic instruction information in the system management memory.

12. The method for executing new instructions of claim 10, wherein when the received instruction is the new instruction, the method for executing new instructions further comprises:
in the system management mode:
generating the at least one old instruction according to the basic instruction information of the received instruction stored in the system management memory; and
executing the at least one old instruction to obtain a simulation execution result of the received instruction.

13. The method for executing new instructions of claim 12, wherein when the received instruction is the new instruction, the method for executing new instructions further comprises:
in the system management mode, storing the simulation execution result in the system management memory.

14. The method for executing new instructions of claim 12, wherein when the received instruction is the new instruction, the method for executing new instructions further comprises:
when exiting the system management mode, storing the simulation execution result stored in the system management memory into an architecture register.

15. The method for executing new instructions of claim 10, wherein the basic instruction information comprises instruction pointer, escape code, operation code, length, and operating mode of the received instruction.

16. The method for executing new instructions of claim 15, wherein when the received instruction is the new instruction, the method for executing new instructions further comprises:
if no exceptions occur during the execution of the at least one old instruction, updating the instruction pointer stored in the system management memory to: EIP+Length, wherein EIP is t the instruction pointer of the received instruction, and Length is the length.

17. The method for executing new instructions of claim 15, wherein when the received instruction is the new instruction, the method for executing new instructions further comprises:
if an exception occurs during the execution of the at least one old instruction, and the exception is a trap, updating the instruction pointer stored in the system management memory to: EIP+Length, wherein EIP is the instruction pointer of the received instruction, and Length is the length.

18. The method for executing new instructions of claim 10, wherein the operating-environment information comprises an operating mode.

19. The method for executing new instructions of claim 18, wherein when the received instruction is the new instruction, the method for executing new instructions further comprises:
if the received instruction cannot be executed in the operating mode, generating a decoding exception; and
storing the decoding exception in the system management memory, and setting an exception flag in the system management memory.

20. The method for executing new instructions of claim 1, wherein when the received instruction is the new instruction, the method for executing new instructions further comprises:
determining whether an exception occurs during the execution of the at least one old instruction; and
if the exception occurred, storing the exception in the system management memory, and setting an exception flag in the system management memory.

21. The method for executing new instructions of claim 20 wherein the exception includes a decoding exception and a runtime exception.

22. The method for executing new instructions of claim 20, wherein when the received instruction is the new instruction, the method for executing new instructions further comprises:
determining whether an exception occurs during the execution of the at least one old instruction; and
if an exception occurred, exiting the system management mode, and executing a microcode handler of the exception.

23. The method for executing new instructions of claim 20, wherein when the received instruction is the new instruction, the method for executing new instructions further comprises:
when the exception is a trap, and when exiting the system management mode, using the information stored in the system management memory to restore the value of the architecture register.

24. The method for executing new instructions of claim 1, wherein when the received instruction is the new instruction, and an operand of the received instruction is a new architecture register, in the system management mode, the new architecture register is simulated by a special register or system management memory.

25. The method for executing new instructions of claim 24, wherein when the new architecture register is a destination operand of the received instruction, the method for executing new instructions further comprises:
after simulation execution of the received instruction is completed, storing the simulation execution result of the received instruction in the special register or the system management memory.

26. The method for executing new instructions of claim 25, wherein when the new architecture register is the destination operand of the received instruction, the method for executing new instructions further comprises:
when exiting the system management mode, doing not store the simulation execution result stored in the special register or the system management memory into the architecture register.

27. The method for executing new instructions of claim 25, further comprising:
receiving another instruction; and
when the another instruction is the new instruction, and the new architecture register is a source operand of the another instruction, directly using the simulation execution result stored in the special register or the system management memory to simulate the execution of the another instruction.

28. The method for executing new instructions of claim 1, wherein when the received instruction is the new instruction, the process of simulating the execution of the received instruction is transparent to the operating system or the application program; wherein the received instruction comes from the operating system or the application program.

29. The method for executing new instructions of claim 1, further comprising:
    determining whether the received instruction is the new instruction according to the prefix, escape code, and operation code of the received instruction.

30. The method for executing new instructions of claim 1, wherein when the received instruction is the new instruction, and the received instruction comprises a memory operand, the method for executing new instructions further comprises:
    converting a virtual address of the memory operand into a physical address; and
    reading a value of the memory operand according to the physical address, wherein the physical address is not in the system management memory.

31. The method for executing new instructions of claim 30, wherein when the received instruction is the new instruction, and the received instruction comprises the memory operand, the method for executing new instructions further comprises:
    converting the virtual address of the memory operand into the physical address by accessing the page table through the direct access interface of the physical memory.

32. The method for executing new instructions of claim 30, wherein when the received instruction is the new instruction, and the received instruction comprises the memory operand, the method for executing new instructions further comprises:
    reading the value of the memory operand according to the physical address by a model specific register.

33. The method for executing new instructions of claim 32, wherein when the received instruction is the new instruction, and the received instruction comprises the memory operand, the method for executing new instructions further comprises:
    writing the address of the model specific register into a first register;
    writing the physical address into a second register; and
    executing a write model specific register instruction to store the value of the memory operand in the model specific register.

34. The method for executing new instructions of claim 33, wherein when the received instruction is the new instruction, and the received instruction comprises the memory operand, the method for executing new instructions further comprises:
    executing a read model specific register instruction to read the value of the memory operand from the model special register, and storing the value of the memory operand in the second register.

35. The method for executing new instructions of claim 33, wherein when the received instruction is the new instruction, and the received instruction comprises the memory operand, the method for executing new instructions further comprises:
    after executing the write model specific register instruction, loading the value of the memory operand from system memory to the model specific register by executing a loading from the physical address microinstruction.

36. A system for executing new instructions, comprising:
    an instruction monitoring unit, configured to determine whether a received instruction is a new instruction;
    wherein when the received instruction is the new instruction, the system for executing new instructions enters a system management mode, and simulates the execution of the received instruction by executing at least one old instruction in the system management mode; and
    an instruction decoding unit, wherein when the received instruction is the new instruction, the instruction decoding unit decodes the at least one old instruction into at least one microinstruction;
    wherein the system for executing the new instructions executes the at least one microinstruction;
    wherein each old instruction is an instruction set architecture instruction.

37. The system for executing new instructions of claim 36, further comprising:
    a private register, coupled to the instruction monitoring unit, the private register containing an emulation flag;
    wherein when the received instruction is the new instruction, the instruction monitoring unit sets the emulation flag in the private register to a first value; and
    the system for executing the new instructions enters the system management mode according to the emulation flag in the private register.

38. The system for executing new instructions of claim 36, further comprising:
    an instruction decoding unit, coupled to the instruction monitoring unit, and the instruction decoding unit decodes the received instruction into a microinstruction, wherein the microinstruction includes an emulation flag;
    when the received instruction is the new instruction, the instruction monitoring unit sets the emulation flag of the microinstruction to a first value to indicate that the received instruction is an instruction to be simulated.

39. The system for executing new instructions of claim 38, wherein when the received instruction is the new instruction, the microinstruction is a no-operation microinstruction, and the emulation flag of the no-operation microinstruction is the first value.

40. The system for executing new instructions of claim 38, further comprising:
    a memory access unit;
    wherein when the received instruction is the new instruction, if the received instruction needs to access the memory, the microinstruction is a special microinstruction; wherein when the emulation flag of the special microinstruction is the first value, the memory access unit uses the special microinstruction to check permissions of the received instruction, and generates a check result; and
    wherein the memory access unit stores the check result in a private register.

41. The system for executing new instructions of claim 40, wherein the check result comprises a virtual address, a physical address, and an error code.

42. The system for executing new instructions of claim 40, wherein the system for executing the new instructions simulates the execution of the received instruction according to the check result.

43. The system for executing new instructions of claim 38, further comprising:
    an instruction retiring unit, configured to generate a system management interrupt according to the emulation flag of the microinstruction; and
    when the received instruction is the new instruction, the system for executing the new instructions enters the system management mode according to the system management interrupt.

44. The system for executing new instructions of claim 43, wherein when the instruction retiring unit submits the received instruction, the instruction retiring unit generates the system management interrupt according to the emulation flag of the microinstruction.

45. The system for executing new instructions of claim 36, further comprising:
 a system management memory, wherein when the received instruction is the new instruction, the system for executing the new instructions stores the basic instruction information and the operating-environment information of the received instruction in the system management memory; and
 in the system management mode, the system for executing the new instructions simulates the execution of the received instruction by executing the at least one old instruction according to the basic instruction information and the operating-environment information stored in the system management memory.

46. The system for executing new instructions of claim 45, further comprising:
 a private register, coupled to the instruction monitoring unit; and
 an instruction decoding unit, coupled to the instruction monitoring unit and the private register, wherein the decoding unit decodes the received instruction to obtain the basic instruction information of the received instruction; the decoding unit stores the basic instruction information of the received instruction in the private register; the system for executing the new instructions reads the basic instruction information from the private register, and stores the read basic instruction information into the system management memory.

47. The system for executing new instructions of claim 45, wherein in the system management mode, the system for executing the new instructions generates the at least one old instruction according to the basic instruction information of the received instruction stored in the system management memory; and the system for executing the new instructions executes the at least one old instruction to obtain a simulation execution result of the received instruction.

48. The system for executing new instructions of claim 47, wherein when the received instruction is a new instruction, in the system management mode, the system for executing the new instructions stores the simulation execution result into the system management memory.

49. The system for executing new instructions of claim 48, further comprising:
 an architecture register; wherein when exiting the system management mode, the system for executing the new instructions writes the simulation execution result stored in the system management memory into the architecture register.

50. The system for executing new instructions of claim 45, wherein the basic instruction information comprises instruction pointer, escape code, operation code, length, and operating mode of the received instruction.

51. The system for executing new instructions of claim 50, wherein when the received instruction is a new instruction, and if no exceptions occur during the execution of the at least one old instruction, the instruction pointer stored in the system management memory is updated to: EIP+Length, wherein EIP is the instruction pointer of the received instruction, and Length is the length.

52. The system for executing new instructions of claim 50, wherein when the received instruction is the new instruction, and if an exception occurs during the execution of the at least one old instruction, and the exception is a trap, then the instruction pointer stored in the system management memory is updated to: EIP+Length, wherein EIP is the instruction pointer of the received instruction, and Length is the length.

53. The system for executing new instructions of claim 45, wherein the operating-environment information comprises an operating mode.

54. The system for executing new instructions of claim 53, wherein if the received instruction cannot be executed in the operating mode, the system for executing the new instructions generates a decoding exception; and
 the system for executing the new instructions stores the decoding exception in the system management memory, and sets an exception flag in the system management memory.

55. The system for executing new instructions of claim 36, wherein in the system management mode, the system for executing the new instructions determines whether an exception has occurred during the execution of the at least one old instruction; if an exception occurs, the system for executing the new instruction stores the exception in the system management memory, and sets an exception flag in the system management memory.

56. The system for executing new instructions of claim 55 wherein the exception includes a decoding exception and a runtime exception.

57. The system for executing new instructions of claim 55, wherein the system for executing the new instructions determines whether the exception has occurred according to the exception flag stored in the system management memory; if the result of the determination is that an exception occurred, the system for executing the new instructions exits the system management mode, and executes the microcode handler of the exception.

58. The system for executing new instructions of claim 55, wherein when the exception is a trap, when exiting the system management mode, the system for executing the new instruction uses the information stored in the system management memory to restore the value of the architecture register.

59. The system for executing new instructions of claim 36, wherein when the received instruction is the new instruction, and an operand of the received instruction is a new architecture register, in the system management mode, the system for executing the new instructions uses a special register or system management memory to simulate the new architecture register.

60. The system for executing new instructions of claim 59, wherein when the new architecture register is a destination operand of the received instruction, after simulation execution of the received instruction is completed, the system for executing the new instructions stores the simulation execution result of the received instruction into the special register or the system management memory.

61. The system for executing new instructions of claim 60, wherein when the new architecture register is the destination operand of the received instruction, when exiting the system management mode, the system for executing the new instructions does not store the simulation execution result stored in the special register or the system management memory into the architecture register.

62. The system for executing new instructions of claim 60, wherein the system for executing the new instructions receives another instruction; when the another instruction is a new instruction, and the new architecture register is the source operand of the another instruction, the system for executing the new instructions directly uses the simulation execution result stored in the special register or the system management memory to simulate the execution of the another instruction.

63. The system for executing new instructions of claim 36, wherein when the received instruction is the new instruction, the process of simulating the execution of the received instruction is transparent to the operating system or the application program; wherein the received instruction comes from the operating system or the application program.

64. The system for executing new instructions of claim 36, wherein the instruction monitoring unit determines whether the received instruction is the new instruction according to the prefix, escape code, and operation code of the received instruction.

65. The system for executing new instructions of claim 36, wherein when the received instruction is the new instruction, and the received instruction comprises a memory operand, the system for executing the new instructions converts a virtual address of the memory operand into a physical address, and reads a value of the memory operand according to the physical address; wherein the physical address is not in the system management memory.

66. The system for executing new instructions of claim 65, wherein when the received instruction is the new instruction, and the received instruction comprises the memory operand, the system for executing the new instructions converts the virtual address of the memory operand into a physical address by accessing the page table through the direct access interface of the physical memory.

67. The system for executing new instructions of claim 65, wherein when the received instruction is the new instruction, and the received instruction comprises the memory operand, the system for executing the new instructions reads the value of the memory operand according to the physical address by a model specific register.

68. The system for executing new instructions of claim 67, wherein when the received instruction is the new instruction, and the received instruction comprises the memory operand, the system for executing the new instructions writes the address of the model specific register into a first register, writes the physical address into a second register, and executes a write model specific register instruction to store the value of the memory operand in the model specific register.

69. The system for executing new instructions of claim 68, wherein when the received instruction is the new instruction, and the received instruction comprises the memory operand, the system for executing the new instructions executes a read model specific register instruction to read the value of the memory operand from the model specific register, and stores the value of the memory operand in the second register.

70. The system for executing new instructions of claim 68, wherein when the received instruction is the new instruction, and the received instruction comprises the memory operand, after the system for executing the new instructions executes the write model specific register instruction, the system loads the value of the memory operand from the system memory to the model specific register by executing a loading from the physical address microinstruction.

* * * * *